US007030899B2

(12) United States Patent
Hoshino et al.

(10) Patent No.: US 7,030,899 B2
(45) Date of Patent: Apr. 18, 2006

(54) IMAGE-FORMING APPARATUS HAVING FUNCTION OF PREVENTING UNEVENNESS OF IMAGE FORMED ON RECORDING MEDIUM

(75) Inventors: Yoshihide Hoshino, Tokyo (JP); Masato Doi, Tokyo (JP); Mitsuharu Kitamura, Tokyo (JP); Yasuhiko Muramatsu, Tokyo (JP)

(73) Assignee: Konica Corporation, Tokyo (JP)

( * ) Notice: Subject to any disclaimer, the term of this patent is extended or adjusted under 35 U.S.C. 154(b) by 486 days.

(21) Appl. No.: 10/192,581

(22) Filed: Jul. 10, 2002

(65) Prior Publication Data

US 2003/0016406 A1 Jan. 23, 2003

(30) Foreign Application Priority Data

| Jul. 19, 2001 | (JP) | ............................... 2001-220244 |
| Jan. 22, 2002 | (JP) | ............................... 2002-013010 |
| Jan. 30, 2002 | (JP) | ............................... 2002-021551 |

(51) Int. Cl.
*B41J 2/435* (2006.01)

(52) U.S. Cl. .................................. 347/236; 347/246

(58) Field of Classification Search ........ 347/236–238, 347/246–247, 251–254, 129–133
See application file for complete search history.

(56) References Cited

U.S. PATENT DOCUMENTS

| 5,739,841 | A |  | 4/1998 | Ng et al. ..................... 347/237 |
| 6,121,993 | A | * | 9/2000 | Maekawara et al. ........ 347/236 |
| 6,172,700 | B1 |  | 1/2001 | Obata ......................... 347/237 |
| 6,266,077 | B1 | * | 7/2001 | Kamimura .................. 347/236 |

FOREIGN PATENT DOCUMENTS

| EP | 0 393 598 A2 | 10/1990 |
| EP | 0 629 974 A1 | 12/1994 |
| EP | 0 948 192 A2 | 10/1999 |
| JP | 05-198952 | 7/1994 |
| JP | 10-181085 | 7/1998 |

* cited by examiner

Primary Examiner—Hai Pham
(74) Attorney, Agent, or Firm—Frishauf, Holtz, Goodman & Chick, P.C.

(57) ABSTRACT

There is described an image-forming apparatus, which can prevent unevenness of an image by controlling the brightness of light-sources. The apparatus includes a light source, including a plurality of light-emitting elements aligned within a predetermined width; an exposure-controlling section to individually control each of intensities of light beams emitted by the plurality of light-emitting elements; and a memory section to store light-intensity compensation data for each of the plurality of light-emitting elements. The image is formed by simultaneously exposing the light beams aligned within the predetermined width onto the photosensitive recording medium, and the exposure-controlling section controls each of the plurality of light-emitting elements based on the light-intensity compensation data concerned, so that each of intensities of the light beams substantially coincides with each of target intensities set in advance.

14 Claims, 22 Drawing Sheets

FIG. 7

| MATERIAL C | |
| MATERIAL B | |

MATERIAL A

| BEAM PITCH ERROR [um] | COMPENSATION VALUE [%] |
|---|---|
| ⋮ | ⋮ |
| − 3 | 110 |
| − 2 | 102 |
| − 1 | 98 |
| 0 | 94 |
| + 1 | 87 |
| + 2 | 84 |
| + 3 | 80 |
| ⋮ | ⋮ |

| TARGET LIGHT INTENSITY [%] | COMPENSATION VALUE [%] |
|---|---|
| ⋮ | ⋮ |
| 20 | 120 |
| 30 | 100 |
| ⋮ | ⋮ |
| 100 | 100 |
| 110 | 95 |
| ⋮ | ⋮ |

| CH | TARGET LIGHT INTENSITY [%] |
|---|---|
| 1 | 76 |
| 2 | 95 |
| 3 | 95 |
| 4 | 95 |
| ⋮ | ⋮ |
| n | 76 |

| ch | R | G | B | (%) |
|---|---|---|---|---|
| 1 | 100 | 90 | 95 | |
| 2 | 100 | 90 | 95 | |
| 3 | 90 | 80 | 85 | |
| 4 | 125 | 115 | 120 | |
| . | . | . | . | |
| . | . | . | . | |
| . | . | . | . | |
| . | . | . | . | |
| n | 110 | 100 | 105 | |

802

IMAGE-FORMING APPARATUS HAVING FUNCTION OF PREVENTING UNEVENNESS OF IMAGE FORMED ON RECORDING MEDIUM

BACKGROUND OF THE INVENTION

The present invention relates to an image-forming apparatus in which a plurality of light-sources expose a photosensitive material to form an image on it, and specifically relates to an image-forming apparatus, which can prevent unevenness of the image by controlling the brightness of light-sources disposed at the both ends of the array of the plurality of light-sources.

For instance, a color image-recording apparatus, which produces a color proof for confirming image data utilized for forming an original plate of printing matters, etc., can be cited as the image-forming apparatus, which forms an image by exposing the photosensitive material with the plurality of light-sources.

In such the image-forming apparatus, a plurality of light beams, each of which is emitted from each of light-emitting elements having colors different each other, such as Read, Green, Blue, etc., are synthesized into one light-beam, which is irradiated onto the photosensitive material. Light emitting diodes (hereinafter, referred to as LEDs) or semiconductor laser devices, etc., are employed as the light-emitting elements mentioned above, and the color image is formed by exposing the photosensitive material with the light beams irradiated from such the light-emitting elements, the light amounts of which are modulated in stepwise on the basis of image data.

Incidentally, one of a plurality of light sources, into each of which light beams emitted from a plurality of light-emitting elements are synthesized, is defined as one channel. The image-forming apparatus incorporates an optical unit in which a plurality of channels are arranged in a sub-scanning direction. Further, the optical unit exposes the photosensitive material, which is rotating in a main-scanning direction, by irradiating the light beams onto it to form the image.

In the abovementioned operation, for every one-revolution of the photosensitive material in the main-scanning direction, the optical unit moves a distance equivalent to the width of the light beam in the sub-scanning direction. Then, the light beams are irradiated onto next recording area to continuously conduct the image-exposing operation. Otherwise, it is applicable that movements in both main-scanning and sub-scanning direction are combined relative to each other. In this case, the optical unit spirally moves on the photosensitive material. Incidentally, a part of the photosensitive material, on which an image-exposing operation with the light beams is conducted during one main-scanning operation, is defined as a recording area.

Incidentally, a light beam, into which light beams emitted from a plurality of light-emitting elements, having colors different each other, are synthesized, is defined as one channel. In the image-forming apparatus having a plurality of channels, there has been a problem that, since the beam profiles vary depending on mounting positions of the light-emitting elements in each channel and manufacturing errors, in angle, etc., of the light-emitting elements itself, image-unevenness are liable to occur when forming the image by irradiating the light beams onto the photosensitive material. To solve the abovementioned problem, each of the beam profiles emitted by each of the light-emitting elements has been adjusted by means of compensation lenses or position/angle adjusting functions, etc., provided for all of the light-emitting elements.

To adjust the beam profiles of the light-emitting elements by means of compensation lenses, etc., however, the cost for employing the compensation lenses are incurred as an additional cost, resulting in an increase of the manufacturing cost of the image-forming apparatus itself. In addition, it has been very difficult to uniformly adjust the all of the beam profiles of the light-emitting elements by means of compensation lenses, etc., and it has been a problem that adjusting processes of the compensation lenses, etc., have considerably increase the total number of the manufacturing processes of the image-forming apparatus.

Further, in the image-forming apparatus having a plurality of channels, it has been a problem that image-unevenness are generated in the image formed on the photosensitive material, due to material-characteristics of the photosensitive material and manufacturing variations occurred during the assembling process of the optical unit in the factory.

Section (a) of FIG. 11 shows a graph of distributions of the light beams irradiated from "n" channels of the optical unit in respect to the positional coordinate of each of "n" channels. The beam profiles irradiated onto the exposing surface of the photosensitive material are indicated at the upper section of FIG. 11. In the beam profiles shown in FIG. 11, the center areas are denoted by dot 100-1, 100-2, - - - , 100-n (hereinafter, totally denoted by "dots 100"). Concretely speaking, dot 100-1 denotes the center area of the beam profile emitted from channel 1, while dot 100-n denotes the center area of the beam profile emitted from channel "n".

Further, in the beam profiles shown in FIG. 11, the peripheral areas dispersed from dots 100 are denoted by peripheral area 101-1, 101-2, - - - , 101-n (hereinafter, totally denoted by "peripheral areas 101"). Still further, in section (a) of FIG. 11, waveforms N1, N2, - - - , Nn indicate light amount characteristics of channels 1, 2, - - - , "n", respectively.

In section (a) of FIG. 11, each of peripheral areas 101 of the light beams irradiated from channels 2, 3, - - - , "n-1" (hereinafter, referred to as central arrayed channels), excluding channels 1 and "n" (hereinafter, referred to as both-end channels) from "n" channels, overlaps with those of adjacent light beams located at both sides of it. Accordingly, the light amount of the light beams, irradiated onto the exposing surface of the photosensitive material from the central arrayed channels, becomes uniform.

With respect to the both-end channels, however, there is no adjacent light beam at one side of it. Therefore, the light amount, irradiated onto the exposing surface of the photosensitive material from the both-end channels, abruptly decreases, as shown in section (a) of FIG. 11.

Section (b) of FIG. 11 shows a graph of color developing density of the photosensitive material exposed by the light beams irradiated from the optical unit in respect to the positional coordinate of each of "n" channels. In section (b) of FIG. 11, the solid line indicates the density characteristics of material "a", while the one dotted chain line indicates the density characteristics of material "b". Materials "a" and "b" are photosensitive materials having material characteristics being different each other.

Further, FIG. 12 shows the material characteristics of materials "a" and "b". Density X indicates an optimum density for forming an image on the photosensitive material. When a light beam having light amount Y is exposed on materials "a" and "b", a color of density X, being an optimum density, is developed on both materials. However, when the light amount of the light beam decreases to light amount Y', which is exposed on materials "a" and "b", a color of density $X_A$ is developed on material "a", while a color of density $X_B$ is developed on material "b".

As mentioned in the above, sometimes, the densities of the developed color are different relative to each other depending on the difference between material characteristics of the photosensitive materials. Accordingly, as shown in sections (a) and (b) of FIG. 11, the densities of the images formed at both ends of the recording areas of materials "a" and "b" are different relative to each other, due to the decrease of the light amount exposed by the light beam. Thus, it has been a problem that density-unevenness, generated in the formed image, have degraded the final image quality.

As a countermeasure to solve the above-mentioned problem, for instance, assuming that sections (a) of FIG. 11 indicates light amount characteristics of "n" channels at "m" times of main-scanning operations, it is applicable to control the movement of the optical unit in the sub-scanning direction so that peripheral area 101-n at "m" times of main-scanning operations overlaps with peripheral area 101-1 at "m+1" times of main-scanning operations, in order to compensate the decrease of the light amount of peripheral area 101-n. It is necessary, however, to vary a moving width in the sub-scanning direction corresponding to the material characteristics of the photosensitive material. Further, since color developing characteristics with respect to the light amount of the light-emitting element for each color are sometimes different respectively, and further, variations of the moving width in the sub-scanning direction result in a change of printed image size, it has been difficult to practically apply the abovementioned countermeasure.

As another countermeasure, it might be possible to adjust pitch "p" so that peripheral area 101-n at "m" times of main-scanning operations overlaps with peripheral area 101-1 at "m+1" times of main-scanning operations. As well as the above countermeasure, however, it has been difficult to vary pitch "p" corresponding to the difference between the material characteristics of the photosensitive material.

Further, sometimes, the light amount characteristics of the light beams emitted by the optical unit vary depending on the individuality of each optical unit, due to manufacturing variations occurred during the assembling process of the optical unit in the factory. In such the case, it is necessary to further apply the abovementioned countermeasure corresponding to the light amount characteristics of the individual optical unit, and it has been further difficult to practically apply the abovementioned countermeasure.

For instance, a method for compensating the light amount of the light beams irradiated from both-end channels in response to a moving amount in the sub-scanning direction is set forth in Tokkaihei 10-181085 and is well-known as one of conventional technologies. This method, however, requires a detecting circuit for detecting the moving amount in the sub-scanning direction, resulting in a complicated configuration of the image-forming apparatus. Further, a method for changing an intensity of the laser beam with the compensating laser beams equipped for both-end channels in response to image data is set forth in Tokkaihei 6-198952 and is well-known as another one of conventional technologies. However, when the intensities of the laser beams irradiated from both-end channels are too strong, it is impossible to subtract the intensity of the laser beam with the compensating laser beams.

Next, when the image is formed on the photosensitive material by simultaneously scanning a plurality of light beams along a plurality of lines on the photosensitive material in a main-scanning direction while moving them in a sub-scanning direction, the image-unevenness would be generated due to moving errors in the sub-scanning direction.

The image-unevenness would occur, when main-scanning line A overlaps with next main-scanning line B as shown in FIG. 24(a), or when a gap is generated between main-scanning line A and next main-scanning line B as shown in FIG. 24(b).

In case shown in FIG. 24(a), the density of overlapped area C, which is higher than the objective density for the area, periodically emerges as shown in FIG. 24(c) while the density of gap area D, which is lower than the objective density for the area, periodically emerges as shown in FIG. 24(d), resulting in the image-unevenness.

To eliminate such the image-unevenness, the following methods have been proposed.

(1) As set forth in Tokkaihei 10-181085, by detecting the moving amount in the sub-scanning direction, the image-forming operation is conducted in such a manner that, when two main-scanning lines overlap each other, the density of the overlapped area within the next main-scanning line is lowered, while, when the gap is generated between two main-scanning lines, intensity of the light beam irradiated onto a part adjacent to the gap is increased.

(2) As set forth in Tokkaihei 6-198952, by providing the compensating laser beam for irradiating a light onto the gap portion, when the gap is generated between two main-scanning lines, intensity of the light beam irradiated by the compensating laser beam is changed corresponding to the gap.

The methods described in items (1) and (2), however, have included the following problems.

Regarding to item (1), to accurately detect the moving amount in the sub-scanning direction, the additional devices, such as a liner encoder, etc., are necessary, resulting in a big raise of the manufacturing cost.

Regarding to item (2), the method is effective only for compensating the gaps generated between main-scanning lines.

(3) The abovementioned image-unevenness can be categorized into three cases, such as the first case in which a main-scanning line overlaps with the next main-scanning line, the second case in which a gap is generated between a main-scanning line and the next main-scanning line and the third case in which either a main-scanning line overlaps with the next main-scanning line or a gap is generated between a main-scanning line and the next main-scanning line. However, one of the three cases is automatically determined for each of the apparatus.

(4) As shown in FIG. 25, the image-unevenness becomes unnoticeable at a certain number of unevenness bars per unit area, depending on the density difference.

SUMMARY OF THE INVENTION

To overcome the abovementioned drawbacks in conventional image-forming apparatus, it is the first object of the present invention to provide an image-forming apparatus, in which an occurrence of density-unevenness in the image is prevented by compensating the light amount of each light source, or by compensating the light amount of each channel located at the both ends of the channel array. Further, it is the second object of the present invention to provide an image-forming method for reducing the image-unevenness, caused by moving errors in the sub-scanning direction, at an unnoticeable level without increasing the cost of the image-forming apparatus.

Incidentally, hereinafter, the term of "light amount" is also referred to as "light-intensity" or "intensity".

Accordingly, to overcome the cited shortcomings, the abovementioned object of the present invention can be attained by image-forming apparatus described as follow.

(1) An apparatus for forming an image onto a photosensitive recording medium, comprising: a light source, including a plurality of light-emitting elements aligned within a predetermined width; an exposure-controlling section to individually control each of intensities of light beams emitted by the plurality of light-emitting elements; and a memory section to store light-intensity compensation data for each of the plurality of light-emitting elements; wherein the image is formed by simultaneously exposing the light beams aligned within the predetermined width onto the photosensitive recording medium; and wherein the exposure-controlling section controls each of the plurality of light-emitting elements based on the light-intensity compensation data concerned, so that each of intensities of the light beams substantially coincides with each of target intensities set in advance.

(2) The apparatus of item 1, further comprising; a main-scanning mechanism to move either the photosensitive recording medium or the light source in a main-scanning direction; and a sub-scanning mechanism to move either the light source or the photosensitive recording medium in a sub-scanning direction.

(3) The apparatus of item 1, wherein wavelengths of the light beams emitted by the plurality of light-emitting elements are different relative to each other.

(4) The apparatus of item 3, wherein each color of cyan, magenta and yellow is developed on the photosensitive recording medium, corresponding to each wavelength of the light beams, to form a full color image on the photosensitive recording medium; and wherein the exposure-controlling section includes a recognizer for recognizing light beams corresponding to colors of cyan and magenta, and the exposure-controlling section controls intensities of light beams only corresponding to the colors of cyan and magenta.

(5) The apparatus of item 1, wherein the light-intensity compensation data correspond to an overlapped-intensity distribution of the light beams aligned within the predetermined width.

(6) An apparatus for forming an image onto a photosensitive recording medium, comprising:
a light source, including a plurality of light-emitting elements aligned within a predetermined width; an exposure-controlling section to individually control each of intensities of light beams emitted by the plurality of light-emitting elements; a main-scanning mechanism to move either the photosensitive recording medium or the light source in a main-scanning direction; a sub-scanning mechanism to move either the light source or the photosensitive recording medium in a sub-scanning direction; and a memory section to store light-intensity compensation data for each of the plurality of light-emitting elements; wherein the image is formed by simultaneously exposing the light beams aligned within the predetermined width onto the photosensitive recording medium, and in case that an image-unevenness is generated in the sub-scanning direction due to duplications of main-scanning lines occurring every main-scanning operation, the memory section stores such the light-intensity compensation data that makes it possible to generate a density-difference being equivalent to that between the image-unevenness and a target density set in advance; and wherein the exposure-controlling section controls each of the plurality of light-emitting elements based on the light-intensity compensation data concerned, so that each of intensities of the light beams substantially coincides with each of target intensities set in advance.

(7) The apparatus of item 6, wherein, when a number of the plurality of light-emitting elements is defined as "N", and a number of positions within one main-scanning line, at each of which the density-difference is generated, is defined as "n", the following equation is established within the predetermined width, $$1 \leq n < N/2.$$

(8) The apparatus of item 6, wherein wavelengths of the light beams emitted by the plurality of light-emitting elements are different relative to each other, and the exposure-controlling section controls an intensity of only one of the light beams having a wavelength, which develops a color component having a most noticeable image-unevenness.

(9) The apparatus of item 6, wherein each of intensities of the light beams is changed in response to each of wavelength-differences between the light beams emitted by the plurality of light-emitting elements.

(10) The apparatus of item 9, wherein, when each of the target intensities is set at 100%, each of intensities of the light beams can be changed in a range of 70%–130% in response to each of the wavelength-differences.

(11) An apparatus for forming an image onto a photosensitive recording medium, comprising: a light source, including a plurality of light-emitting elements aligned within a predetermined width; an exposure-controlling section to individually control each of intensities of light beams emitted by the plurality of light-emitting elements; and a memory section to store light-intensity compensation data for each of the plurality of light-emitting elements; wherein the image is formed by simultaneously exposing the light beams aligned within the predetermined width onto the photosensitive recording medium; and wherein the light-intensity compensation data varies with changes of density-characteristics of developed color versus exposing light-intensity in regard to the photosensitive recording medium, and the exposure-controlling section controls each of the plurality of light-emitting elements based on the light-intensity compensation data concerned, so that each of intensities of the light beams substantially coincides with each of target intensities set in advance.

(12) The apparatus of item 11, further comprising: a main-scanning mechanism to move either the photosensitive recording medium or the light source in a main-scanning direction; a sub-scanning mechanism to move either the light source or the photosensitive recording medium in a sub-scanning direction.

(13) An apparatus for forming an image onto a photosensitive recording medium, comprising: a light source, including a plurality of light-emitting elements aligned within a predetermined width; an exposure-controlling section to individually control each of intensities of light beams emitted by the plurality of light-emitting elements; and a memory section to store light-intensity compensation data for at least either one of the plurality of light-emitting elements located at one end of the predetermined width or two of the plurality of light-emitting elements located at both ends of the predetermined width; wherein the image is formed by simultaneously exposing the light beams aligned within the predetermined width onto the photosensitive recording medium; and wherein the exposure-controlling section controls each of the plurality of light-emitting elements based on the light-intensity compensation data concerned, so that each of intensities of the light beams substantially coincides with each of target intensities set in advance.

(14) The apparatus of item 13, further comprising: a main-scanning mechanism to move either the photosensitive recording medium or the light source in a main-scanning direction; a sub-scanning mechanism to move either the light source or the photosensitive recording medium in a sub-scanning direction.

(15) The apparatus of item 13, wherein the light-intensity compensation data correspond to a manufacturing error of the predetermined width.

(16) The apparatus of item 13, wherein the light-intensity compensation data correspond to image-developing characteristics of the photosensitive recording medium in respect to the predetermined width of the plurality of light-emitting elements.

(17) The apparatus of item 13, wherein the light-intensity compensation data varies with changes of density-characteristics of developed color versus exposing light-intensity in regard to the photosensitive recording medium.

(18) The apparatus of item 13, wherein each color of cyan, magenta and yellow is developed on the photosensitive recording medium, corresponding to each wavelength of the light beams, to form a full color image on the photosensitive recording medium; and wherein the exposure-controlling section includes a recognizer for recognizing a light beam corresponding to a color of cyan or magenta in regard to light beams located at both ends of the predetermined width, and the exposure-controlling section controls intensities of a light beam only corresponding to the color of cyan or magenta.

Further, to overcome the abovementioned problems, other image-forming apparatus, embodied in the present invention, will be described as follow:

(19) An image-forming apparatus characterized in that,
in the image-forming apparatus, which is provided with a light source means having a plurality of light sources aligned in a line and an exposure-controlling means for controlling each of light amounts of the light sources, and in which an image is formed by simultaneously irradiating light beams of each of the light sources and conducting an exposing-operation within a predetermined width onto a photosensitive recording medium,
the image-forming apparatus further comprises a memory means for memorizing light-amount compensation data for light sources located at one end and another end among the plurality of light sources included in the light source means; and
the exposure-controlling means controls the light amounts for light sources located at the one end and the other end, by compensating for desired light amounts for light sources located at the one end and the other end, based on light-amount compensation data stored in the memory means.

Among the plurality of light sources included in the light source means, the light amounts of light sources located at the one end and the other end can be adjusted by compensating for the light amounts for light sources located at the one end and the other end, based on the light-amount compensation data stored in the memory means. Accordingly, when forming the image onto the photosensitive recording medium by exposing it with the light source means, it becomes possible to adjust the exposing amount emitted by the light sources located at the one end and the other end. As a result, it becomes possible to reduce the image-unevenness caused by decreases, etc. of the exposing amount emitted by the light sources located at the one end and the other end.

(20) The image-forming apparatus, recited in item 19, characterized by further comprising:
data-value variable means for varying a value of the light-amount compensation data stored in the memory means.

The value of the light-amount compensation data can be changed by employing the data-value variable means for varying a value of the light-amount compensation data. Accordingly, it becomes possible to arbitrarily set adjusting amounts of the light sources located at the one end and the other end of the light source means.

(21) The image-forming apparatus, recited in item 19 or 20, characterized in that the memory means stores plural kinds of the photosensitive recording media and the light-amount compensation data, which are established on the basis of characteristics of the plural kinds of the photosensitive recording media, and further comprises a selecting means for selecting one kind of the photosensitive recording medium out of the plural kinds of the photosensitive recording media stored in the memory means and the exposure-controlling means conducts the abovementioned compensating operation based on the light-amount compensation data corresponding to the kind of the photosensitive recording medium selected by the selecting means.

The exposing amount emitted by the light sources located at the one end and the other end of the light source means can be controlled according as the characteristics of the photosensitive recording medium by storing the light-amount compensation data for every characteristics of the photosensitive recording medium in the memory means and by adjusting the light amount of the light sources located at the one end and the other end, based on the light-amount compensation data corresponding to the characteristics of the photosensitive recording medium employed. As a result, it becomes possible to reduce the image-unevenness caused by decreases, etc. of the exposing amount emitted by the light sources located at the one end and the other end.

(22) The image-forming apparatus, recited in item 19 or 20, characterized in that the memory means stores plural sets of light-amount compensation data corresponding to arranging conditions of the light sources included in the light source means, and further comprises a selecting means for selecting one set of light-amount compensation data out of the plural sets of light-amount compensation data stored in the memory means, and the exposure-controlling means conducts the abovementioned compensating operation based on the one set of light-amount compensation data selected by the selecting means.

The exposing amount emitted by the light sources located at the one end and the other end of the light source means onto the recording medium can be adjusted in response to the difference between the arranging conditions of the light sources, by storing the light-amount compensation data in the memory means, for every arranging condition (for instance, arranged positions of the light sources) of the light sources included in the light source means, and by adjusting the light amount of the light sources located at the one end and the other end, based on the light-amount compensation data corresponding to the arranging condition of the light sources employed. As a result, it becomes possible to reduce the image-unevenness caused by decreases, etc. of the exposing amount emitted by the light sources located at the one end and the other end.

(23) The image-forming apparatus, recited in anyone of items 19–22, characterized in that each of the light sources includes a plurality of light-emitting elements, and the memory means stores the light-amount compensation data for each of light-emitting elements of the light sources located at the one end and the other end, among the plural light sources included in the light source means, and the exposure-controlling means compensates for each of light-emitting elements of the light sources located at the one end and the other end, by compensating for desired light amounts for each of light-emitting elements of the light sources located at the one end and the other end, based on the light-amount compensation data for a light-emitting element concerned, which are stored in the memory means.

The light amounts at the one end and the other end can be adjusted by compensating for each of the light-emitting elements to the desired light amount, based on the light-amount compensation data for the plurality of the light-emitting elements having colors different relative to each other, which constitute the light sources located at the one end and the other end of the light source means. As a result, it becomes possible to reduce the image-unevenness caused by decreases, etc. of the exposing amount emitted by the light sources located at the one end and the other end.

(24) The image-forming apparatus, recited in anyone of items 19–23, characterized in that the memory means stores target light-amount compensation data, which are established according to a desired density of the image to be formed onto the recording medium, and the exposure-controlling means controls the light sources located at the one end and the other end by compensating for the desired light amount for the light sources located at the one end and the other end, based on the target light-amount compensation data stored in the memory means.

Even if the density of the image formed on the recording medium varies depending on the differences between material characteristics or requests of the operator, it becomes possible to adjust light amount at the one end and the other end corresponding to the desired density. As a result, it becomes possible to reduce the image-unevenness of the image formed on the recording medium.

(25) The image-forming apparatus, recited in anyone of items 19–24, characterized in that,
in the image-forming apparatus, which forms a full color image by irradiating light beams emitted from the light sources onto the recording medium so as to develop colors of cyan, magenta and yellow,
the exposure-controlling section includes a judging section for judging whether or not the light beams of the light sources located at the one end and the other end correspond to colors of cyan and magenta developed on the recording medium, and conducts the above-mentioned compensation operation, when the light beams correspond to colors of cyan and magenta.

Since it is rather difficult for the human eyesight to notice the image-unevenness of color yellow in the full color image formed on the recording medium by exposing operation of the image-forming apparatus, the light amounts only for the light-emitting elements included in the light sources located at the one end and the other end, which irradiate light beams for exposing colors of cyan and magenta, are compensated for. As a result, it becomes possible to complete the light-amount compensation operation more speedy, compared to the case in which all of the light-emitting elements, included in the light sources located at the one end and the other end, are compensated for.

(26) An image-forming apparatus, characterized in that,
in the image-forming apparatus, which is provided with a light source means having a plurality of light sources and an exposure-controlling means for controlling each of light amounts of the light sources, and in which an image is formed by simultaneously irradiating light beams of each of the light sources and conducting an exposing-operation within a predetermined width onto a photosensitive recording medium,
the image-forming apparatus further comprises a memory means for memorizing light-amount compensation data for each of the light sources; and
the exposure-controlling means controls each of the light sources, by compensating for desired light amounts for each of the light sources, based on light-amount compensation data of the corresponding light source stored in the memory means.

The light amount of each of the plurality of light sources can be controlled by compensating for the light amount of each of the light sources to the desired light amount, based on the light-amount compensation data. Accordingly, it becomes possible to make the overlapped beam profiles of each of the light sources uniform, and as a result, it becomes possible to reduce the image-unevenness, when forming the image by exposing the light beams emitted from the light sources onto the photosensitive recording medium.

Further, it also becomes possible to reduce a number of manufacturing processes and manufacturing cost at a lower level, compared to the method for adjusting the beam profiles of the light sources with the compensation lens, resulting in an easiness of the compensating operation for the light amount of each of the light sources.

(27) The image-forming apparatus, recited in item 26, characterized in that each of the light sources comprises a plurality of light-emitting elements having colors different relative to each other, and the memory means stores the light-amount compensation data of each light-emitting element of each of the light sources, and the exposure-controlling means controls each light-emitting element of each of the light sources, by compensating for desired light amounts for each light-emitting element of each of the light sources, based on the corresponding light-amount compensation data stored in the memory means.

The light amount of each of the plurality of light sources can be controlled by compensating for the light amount of each light-emitting element to the desired light amount, based on the light-amount compensation data of the plurality of light-emitting elements, which constitute each of the light sources and having colors different relative to each other. Accordingly, it becomes possible to make the overlapped beam profiles of each of the light sources uniform, and as a result, it becomes possible to reduce the image-unevenness, when forming the image by exposing the light beams emitted from the light sources onto the photosensitive recording medium.

(28) The image-forming apparatus, recited in item 26 or 27, characterized in that,
in the image-forming apparatus, which forms a full color image by irradiating light beams emitted from the light sources onto the recording medium so as to develop colors of cyan, magenta and yellow, the exposure-controlling section includes a judging section for judging whether or not the light beams of each of the light sources correspond to colors of cyan and magenta developed on the recording medium, and conducts the abovementioned compensation operation, when the light beams correspond to colors of cyan and magenta.

Since it is rather difficult for the human eyesight to notice the image-unevenness of color yellow in the full color image formed on the recording medium by exposing operation of the image-forming apparatus, the light amounts only for the light-emitting elements, which irradiate light beams for exposing colors of cyan and magenta, are compensated for. As a result, it becomes possible to complete the light-amount compensation operation more speedy, compared to the case in which all of the light-emitting elements are compensated for.

(29) An image-forming method, characterized in that,
in the image-forming method for forming an image by simultaneously main-scanning a plurality of light beams along a plurality of lines on a photosensitive recording medium, while conducting a sub-scanning operation,
when an overlapped area is generated on a main-scanning line and a next main-scanning line, an invisible image-unevenness with plural bars, having a density-difference substantially equivalent to that between a target density and a density of the overlapped area, is formed in the main-scanning lines.

When the overlapped area is generated on the main-scanning line and the next main-scanning line, it becomes possible to make the image-unevenness unnoticeable by forming the invisible unevenness with plural bars, having a density-difference substantially equivalent to that between the target density and the density of the overlapped area, in the main-scanning lines.

In addition, the abovementioned feature can be attained only by controlling the light sources, which emit the light beams, resulting in a cost-reduction of the image-forming apparatus.

(30) An image-forming method, characterized in that,
in the image-forming method for forming an image by simultaneously main-scanning a plurality of light beams along a plurality of lines on a photosensitive recording medium, while conducting a sub-scanning operation,
when a gap is generated between a main-scanning line and a next main-scanning line, an intensity of the light beam irradiated onto a portion adjacent to the gap of the next main-scanning line is intensified, so that an invisible image-unevenness with plural bars, having a density-difference substantially equivalent to that between a target density and a density of the portion at which the intensity of the light beam is intensified, is formed in the main-scanning lines.

When the gap is generated between a main-scanning line and a next main-scanning line, it becomes possible to make the image-unevenness unnoticeable by intensifying the intensity of the light beam irradiated onto the portion adjacent to the gap of the next main-scanning line and by forming the invisible unevenness with plural bars, having a density-difference substantially equivalent to that between the target density and the density of the portion at which the intensity of the light beam is intensified, in the main-scanning lines.

In addition, the abovementioned feature can be attained only by controlling the light sources, which emit the light beams, resulting in a cost-reduction of the image-forming apparatus.

(31) An image-forming method, characterized in that,
in the image-forming method for forming an image by simultaneously main-scanning a plurality of light beams along a plurality of lines on a photosensitive recording medium, while conducting a sub-scanning operation,
when a gap or a duplication is generated between a main-scanning line and a next main-scanning line, an intensity of the light beam irradiated onto a portion adjacent to the gap of the next main-scanning line is intensified, so that an invisible image-unevenness with plural bars, having a density-difference substantially equivalent to that between a target density and a density of the portion at which the intensity of the light beam is intensified, is formed in the main-scanning lines.

When the gap or the duplication is generated between a main-scanning line and a next main-scanning line, it becomes possible to make the image-unevenness unnoticeable by intensifying the intensity of the light beam irradiated onto the portion adjacent to the gap of the next main-scanning line and by forming the invisible unevenness with plural bars, having a density-difference substantially equivalent to that between the target density and the density of the portion at which the intensity of the light beam is intensified, in the main-scanning lines.

In addition, the abovementioned feature can be attained only by controlling the light sources, which emit the light beams, resulting in a cost-reduction of the image-forming apparatus.

(32) An image-forming method, characterized in that, when a color image is formed by employing a plurality of light beams having wavelengths being different relative to each other, the image-forming operation is conducted by employing the image-forming method, recited in anyone of items 29–31, in respect to a specific light beam having a wavelength at which image-unevenness is specifically noticeable.

When a color image is formed by employing a plurality of light beams having wavelengths being different relative to each other, it becomes possible to make the image-unevenness unnoticeable by employing the image-forming method, recited in anyone of items 29–31, to conduct the image-forming operation in respect to the specific light beam having the wavelength at which the image-unevenness is specifically noticeable.

In addition, the abovementioned feature can be attained only by controlling the light sources, which emit the light beams, resulting in a cost-reduction of the image-forming apparatus.

(33) The image-forming method, recited in anyone of items 29–32, characterized in that a relationship between density and an intensity of light beam is investigated in advance, and the intensity of the light beam is changed corresponding to a target density.

It becomes possible to obtain an accurate density, by investigating the relationship between density and the intensity of light beam in advance, and by changing the intensity of the light beam corresponding to the target density.

(34) The image-forming method, recited in anyone of items 29–33, characterized in that the respective light amount of light beams is changed corresponding to a difference between wavelengths of the plurality of light beams.

Owing to errors in the manufacturing process of the light sources emitting the light beams, the wavelengths of the light beams emitted by the light sources are varied, and the densities of the images are also different each other corresponding to the differences between the wavelengths.

By changing the respective light amount of light beams corresponding to a difference between wavelengths of the plurality of light beams, the target density can be obtained.

(35) The image-forming method, recited in anyone of items 29–34, characterized in that the density, obtained by changing the light amount of the light beam, is in a range of 70%–130%, when the target density is set at 100%.

Since the density, obtained by changing the light amount of the light beam, is in a range of 70%–130%, when the target density is set at 100%, the density difference is unnoticeable, even if the obtained image is enlarged.

BRIEF DESCRIPTION OF THE DRAWINGS

Other objects and advantages of the present invention will become apparent upon reading the following detailed description and upon reference to the drawings in which:

FIG. 7 shows a data structure of a light-intensity compensation table by material;

FIG. 8 shows a data structure of a target light-intensity compensation table;

FIG. 9 shows a data structure of a light-intensity compensation table for every channel;

FIG. 14 shows a data structure of a light-intensity compensation table for every channel;

FIG. 24($c$) and FIG. 24($d$) show graphs for explaining an occurrence of the image-unevenness.

DETAILED DESCRIPTION OF THE PREFERRED EMBODIMENT

Figure 1:
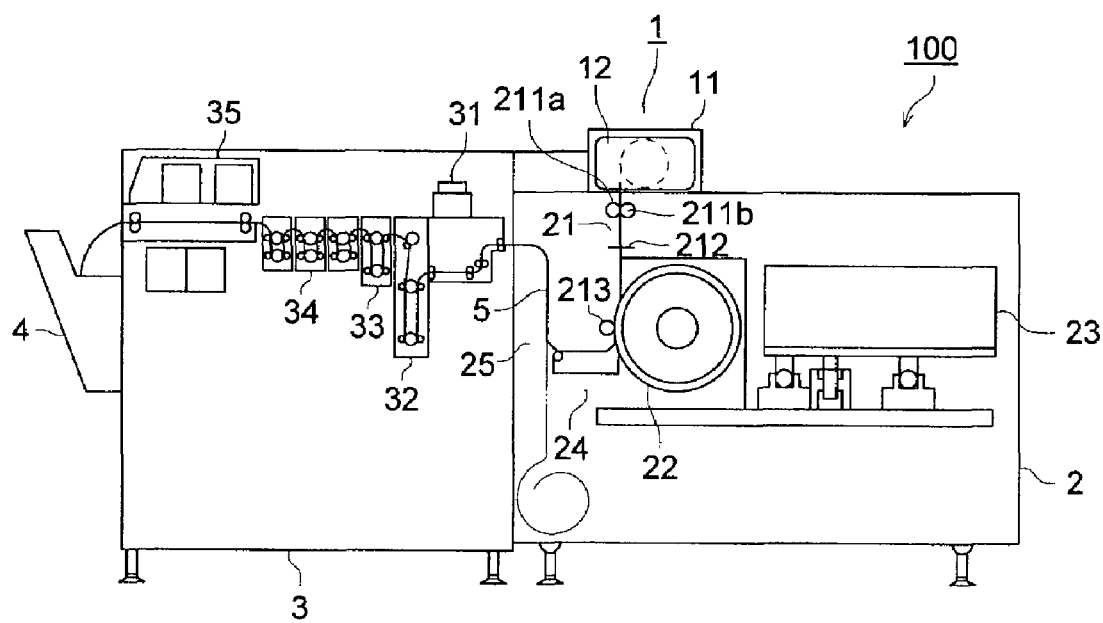
FIG. 1 shows a configuration of an image-forming apparatus embodied in the present invention.

Referring to the drawings, the first embodiment of the present invention will be detailed in the following. FIG. 1 shows a configuration of image-forming apparatus 100 embodied in the present invention. Image-forming apparatus 100 is constituted mainly by paper loading section 1, exposing unit 2, developing process unit 3 and paper delivery tray 4.

Paper loading section 1 is disposed at an upper position of exposing unit 2. Paper feeding cover 11, being capable of opening and closing, is mounted on paper loading section 1, in which exclusive cartridge 12, containing photosensitive material 5 (a recording medium) of rolled-shape, can be set.

Paper feeding section 21, drum 22, optical unit 23, accumulating section 24 and paper ejecting section 25 constitute exposing unit 2, which performs the image-exposing operation for photosensitive material 5.

Paper feeding section 21 comprises paper feeding rollers 211$a$, 211$b$, cutter 212 and paper feeding roller 213. Photosensitive material 5 set in paper loading section 1 is sandwiched between paper feeding rollers 211$a$, 211$b$, and fed to drum 22 by driving the rotating pair of paper feeding rollers 211$a$, 211$b$. Then, photosensitive material 5 is cut by cutter 212 when a predetermined length of photosensitive material 5 is fed to drum 22. Paper feeding roller 213 presses photosensitive material 5 onto drum 22, so as to prevent photosensitive material 5 from generating wrinkles when it is wound around drum 22.

Photosensitive material 5, wound around drum 22, is exposed by the light beam irradiated from optical unit 23, while rotating in the main-scanning direction (namely, the rotating direction of drum 22).

Optical unit 23, serving as a light source means, in which three light beams emitted from three individual light-emitting elements, such as Red-LED, Green-LED and Blue-LED, are synthesized into a single light beam through a mirror, a lens, etc., irradiates the synthesized light beam onto photosensitive material 5 wound around drum 22, while moving in an axial direction of drum 22 (the sub-scanning direction).

In accumulating section 24, photosensitive material 5, on which the image is already exposed, is stored in a hanging state. Since the conveying velocity of photosensitive material 5 in developing process unit 3 is faster than that in exposing unit 2, the conveyance timings of photosensitive material 5 at both developing process unit 3 and exposing unit 2 are adjusted in accumulating section 24.

In paper ejecting section 25, photosensitive material 5 hanging into accumulating section 24 is ejected to developing process unit 3.

Second exposing section 31, developing section 32, fixing section 33, stabilizing section 34 and drying section 35 constitute developing process unit 3, in which the image exposed on photosensitive material 5 is developed. In second exposing section 31, a quasi-image is exposed on the non-exposed portion of photosensitive material 5, on which no image has been exposed in exposing unit 2. In developing section 32, fixing section 33 and stabilizing section 34, developing processes are applied to photosensitive material 5 conveying through them. In drying section 35, photosensitive material 5 having a developed image is dried, and then, ejected to paper delivery tray 4.

Figure 2:
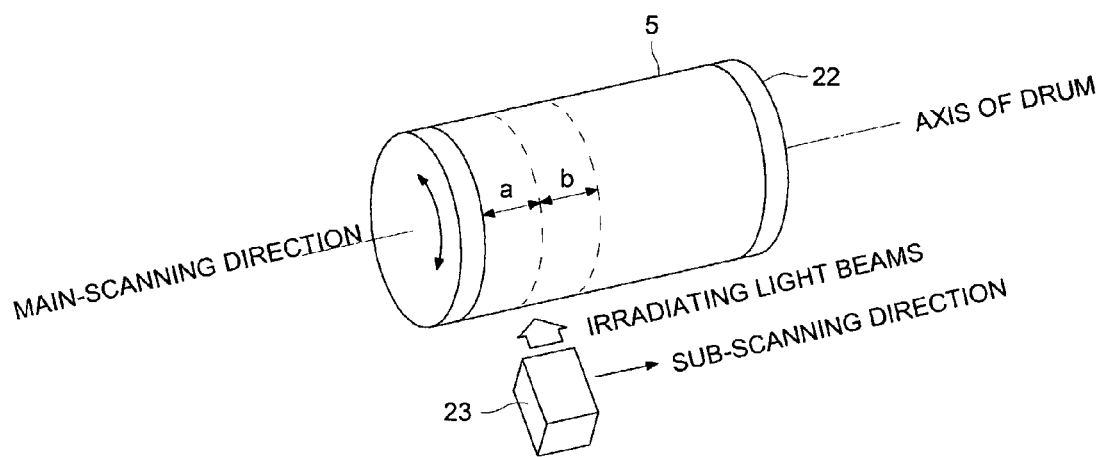
FIG. 2 shows a perspective view of a drum and an optical unit in an image-forming apparatus embodied in the present invention.

FIG. 2 shows a perspective view of drum 22 and optical unit 23 in image-forming apparatus 100. Drum 22, on circumferential surface of which photosensitive material 5 is wound, rotates around a drum axis, and the rotating direction of drum 22 is defined as the main-scanning direction. On the other hand, optical unit 23 continuously moves in parallel to the drum axis from one end of photosensitive material 5, and the moving direction of optical unit 23 is defined as the sub-scanning direction.

Optical unit 23 irradiates the light beam onto photosensitive material 5 wound around drum 22 while moving in the sub-scanning direction, so as to expose photosensitive material 5. Initially, the light beam irradiated by optical unit 23 exposes a part of photosensitive material 5 having width "a". Then, during one revolution of drum 22, optical unit 23 moves a distance equivalent to width "a" in the sub-scanning direction. Accordingly, during next revolution of drum 22, a next part of photosensitive material 5 having width "b" will be exposed. The values of width "a" and width "b" are determined on the basis of a number of light sources arranged in optical unit 23 and a gap distance between the light sources.

Figure 3:
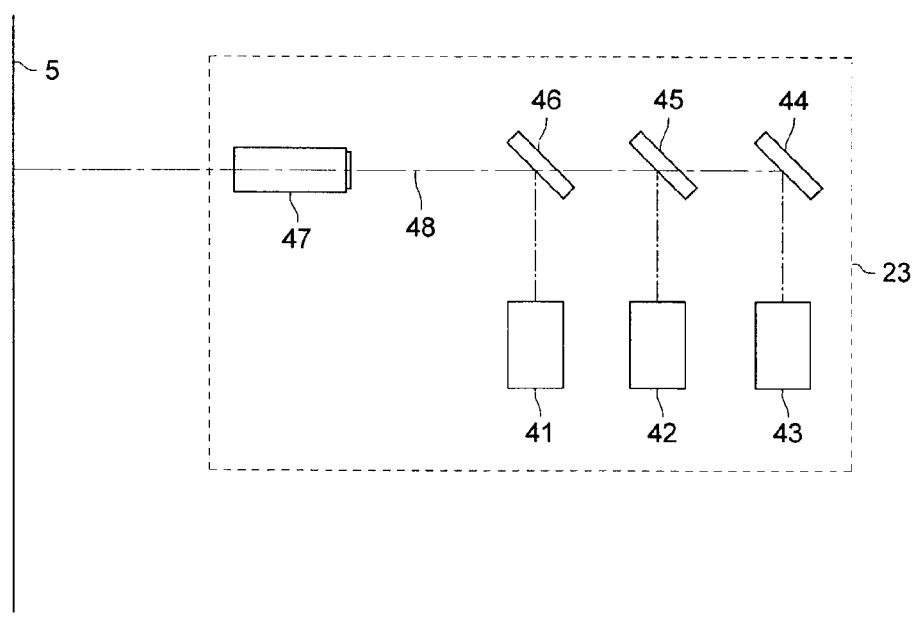
FIG. 3 shows a configuration of an optical unit.

FIG. 3 shows a configuration of optical unit 23. Optical unit 23 comprises light-source holding blocks 41, 42, 43, mirror 44, dichroic mirrors 45, 46, lens 47, etc.

Each of the three light-emitting elements, for instance, Red-LED, Green-LED and Blue-LED, is held in each of light-source holding blocks 41, 42, 43. The configuration of each of light-source holding blocks 41, 42, 43 will be detailed later.

Mirror 44 reflects the first light beam irradiated from light-source holding block 43 toward lens 47. Dichroic mirror 45 reflects the second light beam irradiated from light-source holding block 42 toward lens 47, while the first light beam, irradiated from light-source holding block 43 and reflected by mirror 44, is transmitted through dichroic mirror 45. Dichroic mirror 46 reflects the third light beam irradiated from light-source holding block 41 toward lens 47, while the second light beam, irradiated from light-source holding block 42 and reflected by dichroic mirror 45, and the first light beam irradiated from light-source holding block 43 and transmitted through dichroic mirror 45, are transmitted through dichroic mirror 46. In FIG. 3, one dotted chain lines indicate traveling-locus of the three light beams.

As mentioned above, the three light beams, emitted from light-source holding blocks 41, 42, 43, travel along optical axis 48 after reflected by mirror 44 and dichroic mirrors 45, 46, and are converged and projected onto photosensitive material 5 by lens 47.

Figure 4:
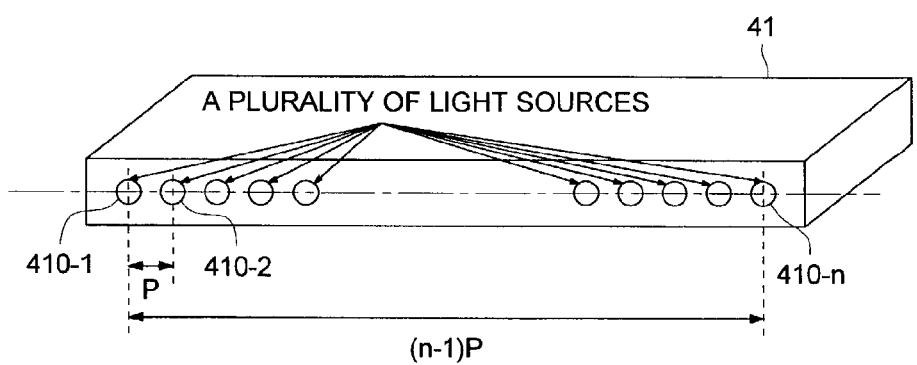
FIG. 4 shows an outlook appearance of a light-source holding block.

FIG. 4 shows an outlook appearance of light-source holding block 41. Since each outlook appearance of light-source holding blocks 42, 43 is the same as that of light-source holding block 41, only light-source holding block 41 will be detailed in the following.

The light-emitting elements, such as LEDs, etc., the number of which is the same as that of the channels, and each of which emits a light having a single uniform color, are mounted in light-source holding block 41. The light beams emitted from LEDs are irradiated toward an external area through light-beam irradiating holes 410-1, 410-2 - - - , 410-n (hereinafter, totally referred to as light-beam irradiating holes 410), which are arranged in a lateral line. The light beam emitted by the LED disposed at channel #1 is irradiated toward an external area after passing through light-beam irradiating hole 410-1, and the light beam emitted by the LED disposed at channel #n is irradiated toward an external area after passing through light-beam irradiating hole 410-n.

Figure 13:
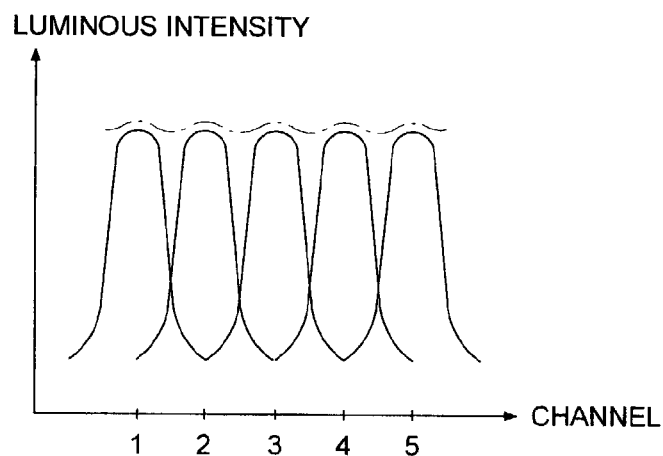
FIG. 13($a$), FIG. 13($b$) and FIG. 13($c$), show graphs of luminous intensities of light beams in respect to the channel number, illustrating beam profiles of the light beams emitted from every channel.
Figure 13:
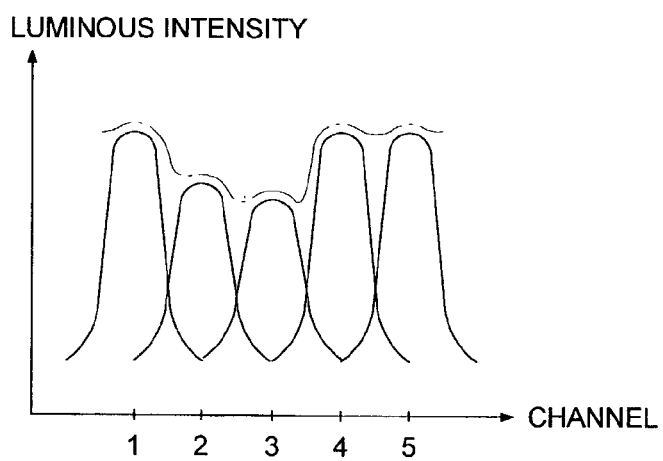
Figure 13:
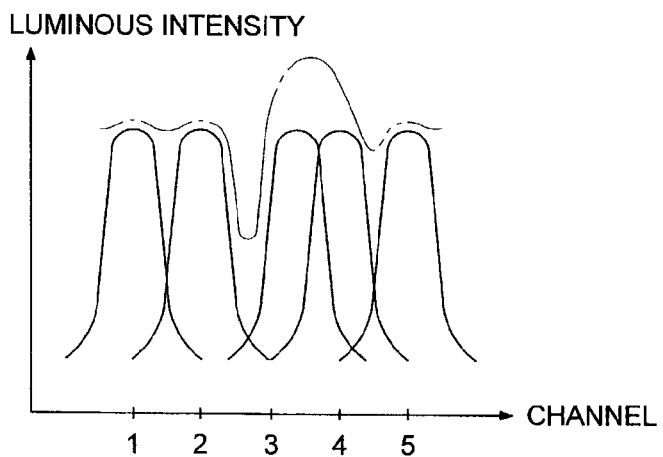

FIG. 13($a$), FIG. 13($b$) and FIG. 13($c$), show graphs of luminous intensities of light beams in respect to the channel number, illustrating beam profiles of the light beams emitted from every channel. In FIG. 13($a$), luminous intensities and beam profiles of the light beams in respect to channels #1–#5 are substantially uniform. Since colors and densities of the image are developed on photosensitive material 5 in proportion to luminous intensities of the light beams, when the beam profiles, each corresponding to each of the channels, are uniform, it is possible to obtain a good quality image without having any image-unevenness formed on photosensitive material 5.

Generally speaking, however, since the property of the light beam considerably varies from one LED to another LED depending on its manufacturing source, the beam profiles of the LEDs are apt to vary even if luminous intensities of the light beams are uniform in respect to all channels. Further, the beam profiles of the LEDs also vary depending on the mounting errors of the LEDs, such as positions, angles, etc., occurring at the time when assembling light-source holding blocks 41, 42, 43 in the factory. Accordingly, variations of the beam profiles are generated between channels, as shown in FIG. 13($b$) and FIG. 13($c$).

In FIG. 13($b$), since the peak values of the beam profiles especially for channels 2 and 3 are lower than those for other channels, color densities of part-areas, exposed by the light beams of channels 2 and 3, are weaker than other part-areas in the image formed on photosensitive material 5. Owing to the above, unevenness of color densities are generated in the image formed on photosensitive material 5, resulting in the deterioration of the image quality.

On the other hand, FIG. 13($c$) shows a case that the beam profile of channel 3 is inclined to a direction toward channel 4. In this case, since the light beam emitted from channel 3 overlaps with the light beam emitted from channel 4, the color density of the part-area between channels 3 and 4 is intensified. Owing to the above, color densities of part-areas, exposed by the light beams of both channels 3 and 4, are stronger than other part-areas in the image formed on photosensitive material 5. While, since a little amount of light beam is irradiated onto the part-area between channels 2 and 3, color densities of part-areas to be exposed by the light beam of channel 3 are weaker than other part-areas in the image formed on photosensitive material 5. Owing to the above reasons, unevenness of color densities are generated in the image formed on photosensitive material 5, resulting in the deterioration of the image quality.

In order to prevent the unevenness in the image due to the variations of the beam profiles, the light intensities of the light beams emitted from all of the channels are adjusted to the desired values, by adjusting an intensity of each of light beams emitted by the LEDs, based on compensation data derived from the characteristics of the LEDs employed for light-source holding blocks 41, 42, 43.

Figure 11:
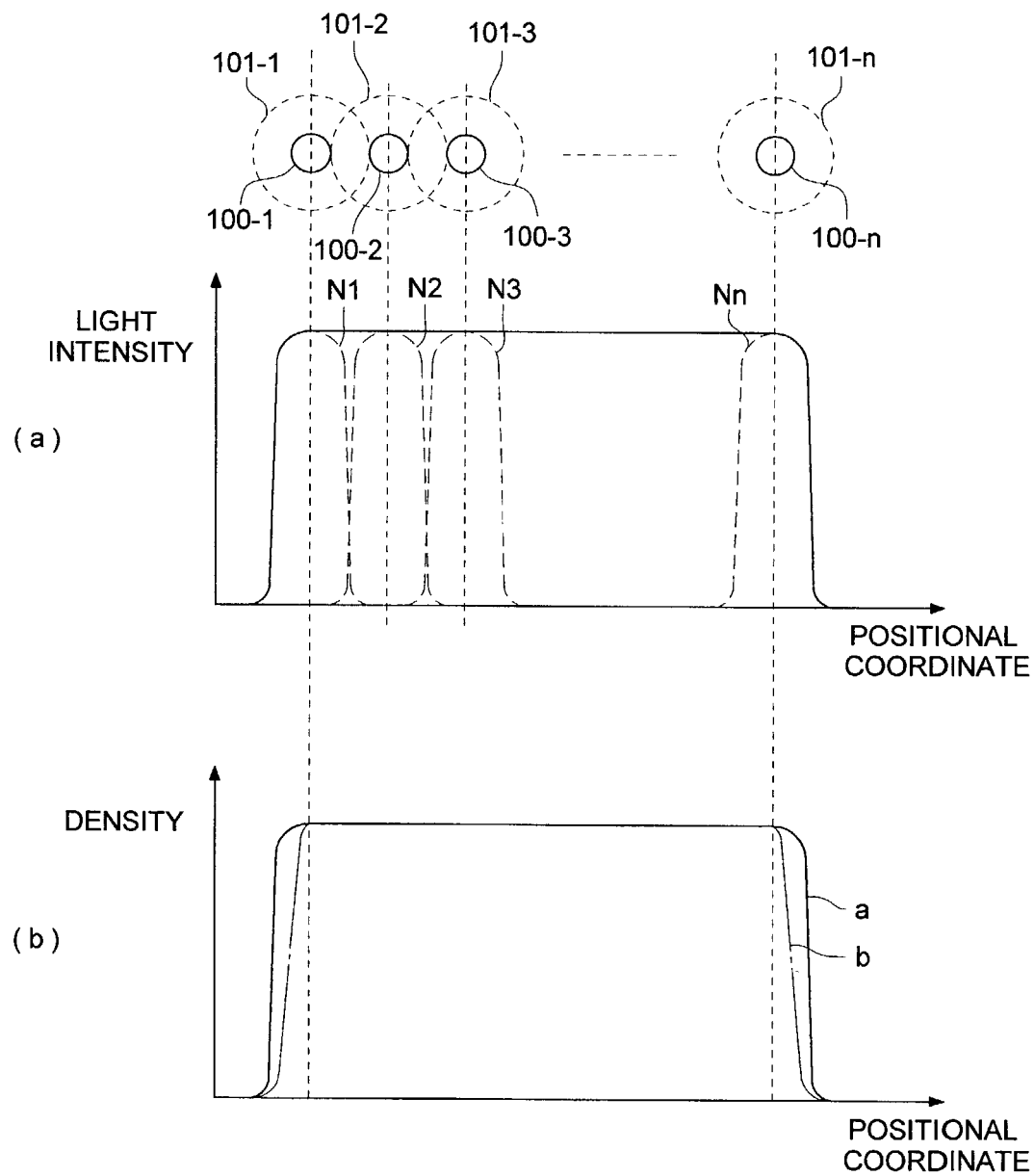
FIG. 11 shows a graph of the light intensity of the light beam emitted from an optical unit, and a graph of the developed color density when exposing with the above light intensity.
Figure 12:
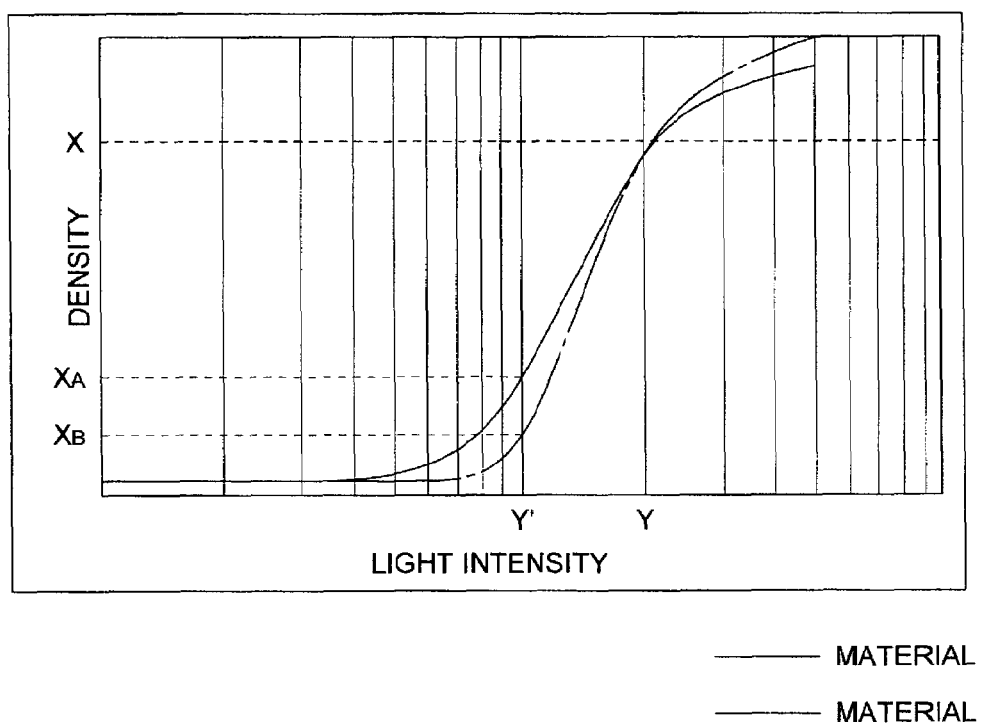
FIG. 12 shows a graph of characteristics of two different photosensitive materials.

On the other hand, the light intensities of the light beams emitted from all of the channels for the same desired density are adjusted to a uniform value, when commencing the exposing operation. As shown in section (a) of FIG. 11, however, there are no adjacent channels at the outside areas of channels 1, "n" located at both ends of the LED-array. Therefore, the light intensities of the light beams irradiated onto photosensitive material 5 from channel peripheral areas 101-1 and 101-n located at the both ends of the LED-array are reduced, compared to those irradiated from the central areas.

Further, in case that beam-pitch errors between light-beam irradiating holes 410 are generated due to the manufacturing variations when assembling light-source holding blocks 41, 42, 43 in the factory, the light-intensity characteristics of individual optical unit 23 would vary from one to another. The beam-pitch is defined as a distance between a center of light-beam irradiating hole 410-1 and a center of light-beam irradiating hole 410-n. As mentioned above, the image-unevenness is generated in the image formed on photosensitive material 5 due to the variations of the optical characteristics of the light beams irradiated from optical unit 23.

Further, sometimes, the density of the partial images, formed at the both end portions of the recording area of photosensitive material 5, would vary due to the difference between material characteristics of photosensitive materials 5. owing to the above, the image-unevenness is generated in the image formed on photosensitive material 5, resulting in the deterioration of the image quality.

To overcome the abovementioned problems, the light intensities of the light beams emitted from both end channels are adjusted to an optimum value, based on compensation data derived from the material characteristics of photosensitive material 5, the beam-pitch characteristics of the light beams irradiated from optical unit 23, etc. The light-intensity compensation processing, for adjusting the intensities of the light beams emitted from both end channels and all of the channels, will be detailed in the following.

Figure 5:
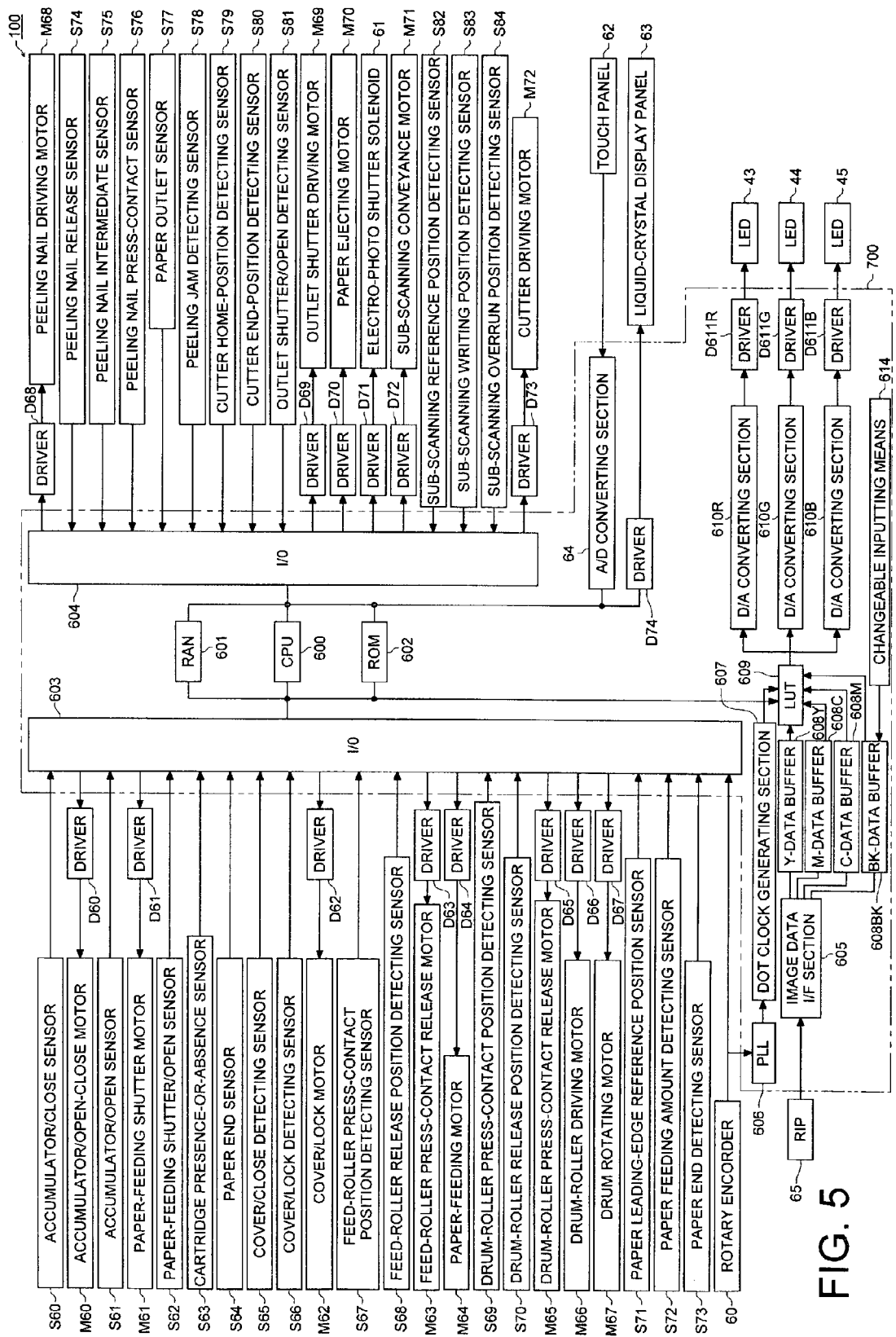
FIG. 5 shows a block diagram of an electronic configuration of an image-forming apparatus embodied in the present invention.

FIG. 5 shows a block diagram of an electronic configuration of image-forming apparatus 100. In FIG. 5, controlling section 700 comprises CPU 600, RAM 601, ROM 602 serving as a memory means, and I/O ports 603, 604 through which various kinds of sensors and actuators are coupled to controlling section 700 and the actuators are controlled on the basis of information sent from the sensors.

The initial values inherent to image-forming apparatus 100 are stored in RAM 601. The data for initializing the various kinds of devices incorporated in image-forming apparatus 100, light-intensity compensation table 800 for each material (hereinafter, referred to as MA light-intensity compensation table 800), target light-intensity compensation table 801 (hereinafter, referred to as TA light-intensity compensation table 801), light-intensity compensation table for every channel 802 (hereinafter, referred to as CH light-intensity compensation table 802), light-intensity compensation program 803 serving as an exposure controlling means, etc. are stored in ROM 602 serving as a memory means. The contents of the data stored in ROM 602 will be detailed later.

Accumulator/close sensor S60, accumulator/open sensor S61, paper-feeding shutter/open sensor S62, cartridge presence-or-absence sensor S63, paper end sensor S64, cover/close detecting sensor S65, cover/lock detecting sensor S66, feed-roller press-contact position detecting sensor S67, feed-roller release position detecting sensor S68, drum-roller press-contact position detecting sensor S69, drum-roller release position detecting sensor S70, paper leading-edge reference position sensor S71, paper feeding amount detecting sensor S72, paper end detecting sensor S73, peeling nail release sensor S74, peeling nail intermediate sensor S75, peeling nail press-contact sensor S76, paper outlet sensor S77, peeling jam detecting sensor S78, cutter home-position detecting sensor S79, cutter end-position detecting sensor S80, outlet shutter/open detecting sensor S81, sub-scanning reference position detecting sensor S82, sub-scanning writing position detecting sensor S83 and sub-scanning overrun position detecting sensor S84 are incorporated in image-forming apparatus 100 as the sensors.

Accumulator/open-close motor M60, paper-feeding shutter motor M61, cover/lock motor M62, feed-roller press-contact release motor M63, paper-feeding motor M64, drum-roller press-contact release motor M65, drum-roller driving motor M66, drum rotating motor M67, peeling nail driving motor M68, outlet shutter driving motor M69, paper ejecting motor M70, sub-scanning conveyance motor M71 and cutter driving motor M72 are incorporated in image-forming apparatus 100 as the actuators, and are controllably driven by drivers D60, D61, D62, D63, D64, D65, D66, D67, D68, D69, D70, D72 and D73.

Further, LCD driver 74 controls liquid-crystal display panel 63 to display the operating statuses of image-forming apparatus 100, etc. on it. While, the operator can input various kinds of setting information from touch panel 62. Analogue-to-digital converting section 64 (hereinafter, referred to as A/D converting section 64) converts the setting information inputted by the operator to digital data, which are further inputted into CPU 600.

The digital image data are inputted from raster image processor 65 (hereinafter, referred to as RIP 65) and further inputted into Y-data buffer 608Y, M-data buffer 608M, C-data buffer 608C and K-data buffer 608K (hereinafter, totally referred to as data buffer 608) through image data I/F section 605.

On the other hand, rotary encoder 60 sends the signals, based on the information for feeding photosensitive material 5, to PLL 606. Synchronizing with the output signals of PLL 606, dot clock generating section 607 outputs the dot clock signals to lookup table 609 (hereinafter, referred to as LUT 609). Then, synchronizing with the dot clock signals, LUT 609 converts the digital image data, inputted from data buffer 608, to R, G, B image data, which are outputted to R-D/A converting section 610R, G-D/A converting section 610G and B-D/A converting section 610B (hereinafter, totally referred to as D/A converting section 610). D/A converting section 610 conducts the digital-to-analogue converting processing for the image data, and outputs the converted image signals to R-LED driver D611R, G-LED driver D611G and B-LED driver D611B (hereinafter, totally referred to as LED driver D611). LED driver D611 drives LEDs included in light-source holding blocks 41, 42, 43.

Figure 6:
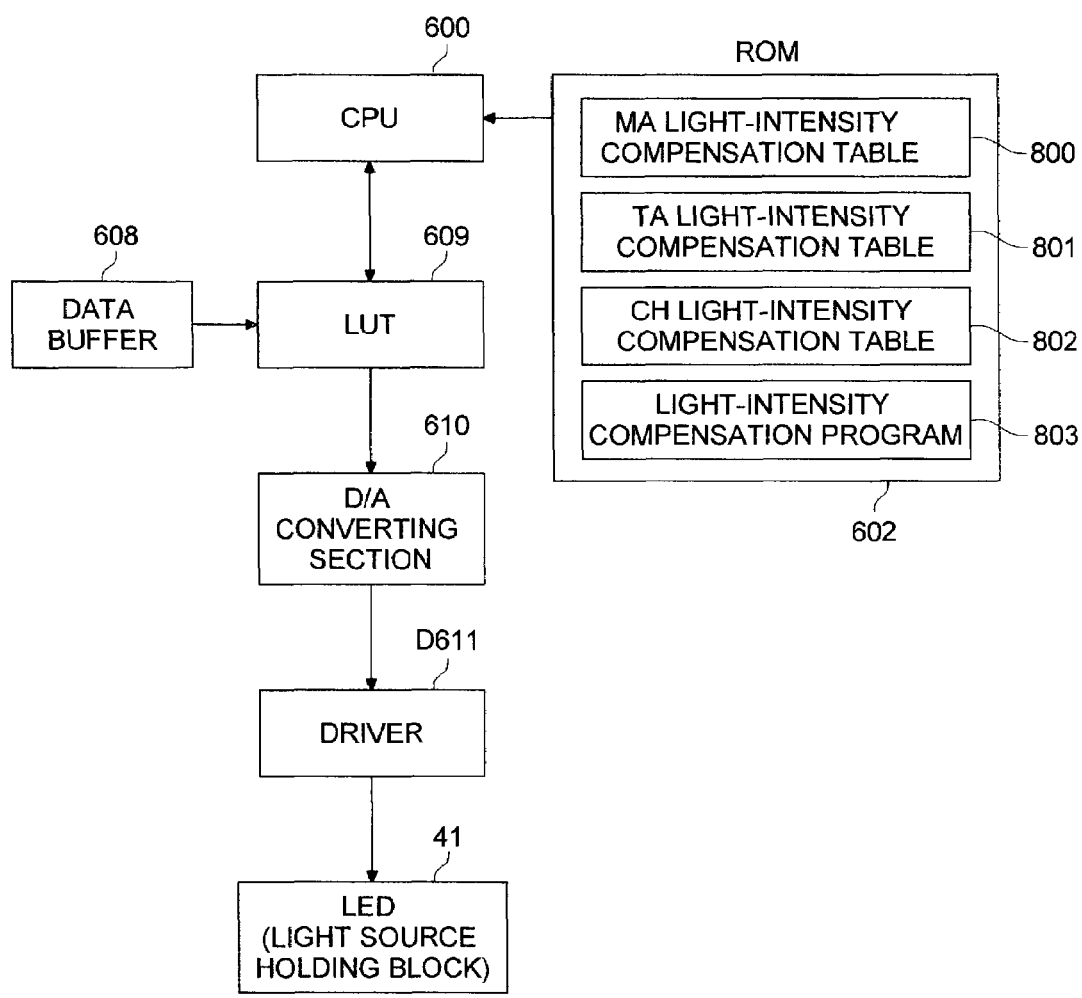
FIG. 6 shows a partial block diagram extracted from the total block diagram of the configuration of the image-forming apparatus shown in FIG. 5.

FIG. 6 shows a partial block diagram extracted from the total block diagram of the configuration of image-forming apparatus 100 shown in FIG. 5. Referring to FIG. 6, the operations of the light-intensity compensation processing will be detailed in the following.

Initially, CPU 600 retrieves light-intensity compensation program 803 from ROM 602 and stores them in RAM 601 to execute the program.

LUT 609 converts the digital image data inputted from data buffer 608 to the R, G, B digital image data, which are outputted to CPU 600. CPU 600 applies the compensation processing to the R, G, B digital image data inputted from LUT 609 on the basis of MA light-intensity compensation table 800, TA light-intensity compensation table 801 and CH light-intensity compensation table 802.

After the compensation processing is completed, CPU 600 outputs the compensated R, G, B digital image data to D/A converting section 610 to conduct the digital-to-analogue converting processing. The converted R, G, B image-signals are outputted to LED driver D611, which drive the LEDs included in light-source holding blocks 41, 42, 43, based on the R, G, B image-signals inputted.

On the other hand, FIG. 14 shows a data structure of CH light-intensity compensation table 802. The compensation data in respect to Red-LEDs, Green-LEDs and Blue-LEDs for each channel constitute CH light-intensity compensation table 802. The compensation data are determined as default data from measurements obtained by measuring characteristics of the light beams emitted from light-source holding blocks 41, 42, 43, and then, CH light-intensity compensation table 802 is stored in ROM 602, before shipping image-forming apparatus 100 from the factory.

Figure 15:
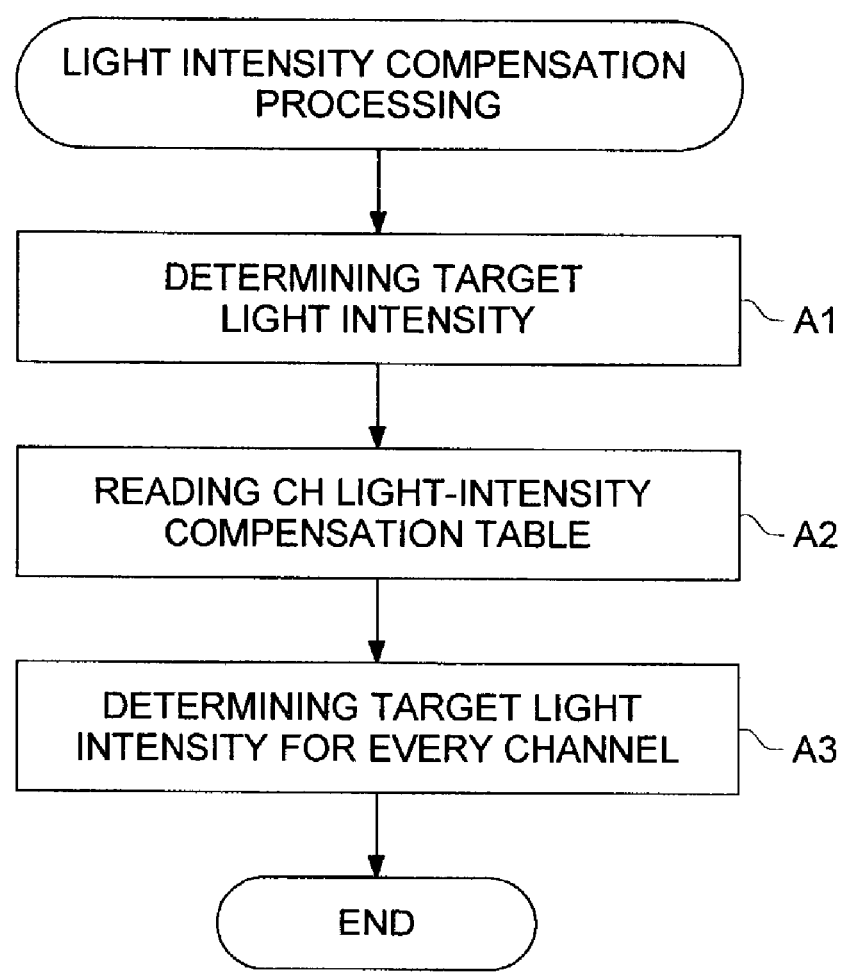
FIG. 15 shows a flowchart of a light-intensity compensation processing.

FIG. 15 shows a flowchart of the light-intensity compensation processing. At first, LUT 609 converts the digital image data inputted from data buffer 608 to the R, G, B image data so as to determine a target light intensity, and then, outputs the converted R, G, B image data to CPU 600 (step A1).

Next, CPU 600 retrieves CH light-intensity compensation table 802 from ROM 602 (step A2). Then, CPU 600 applies the compensation processing to the R, G, B image data inputted from LUT 609, based on the data included in CH light-intensity compensation table 802, and then, outputs the compensated R, G, B image data to LUT 609 (step A3). Then, the light-intensity compensation processing is finalized.

Figure 16:
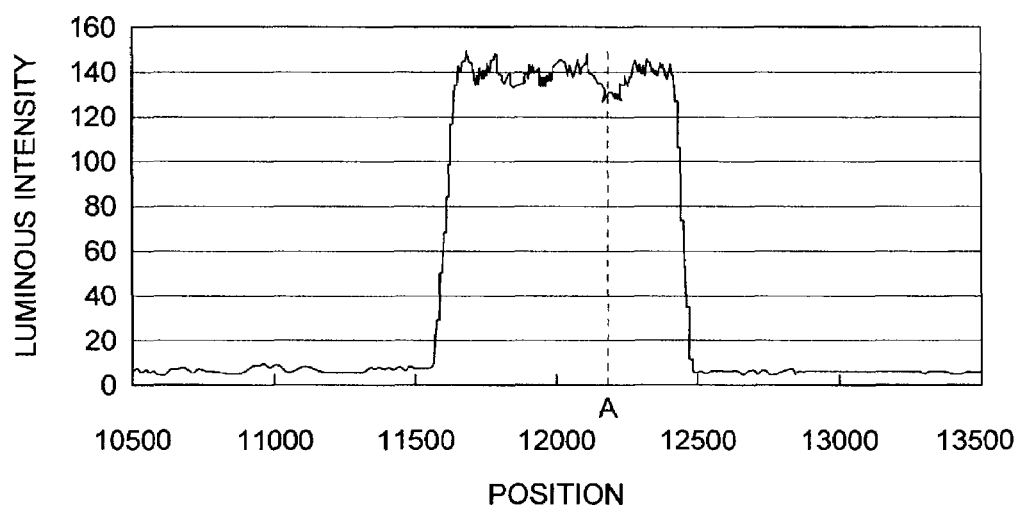
FIG. 16($a$) and FIG. 16($b$) show graphs of intensity transients of light beams emitted from all over channels included in an optical unit embodied in the present invention.
Figure 16:
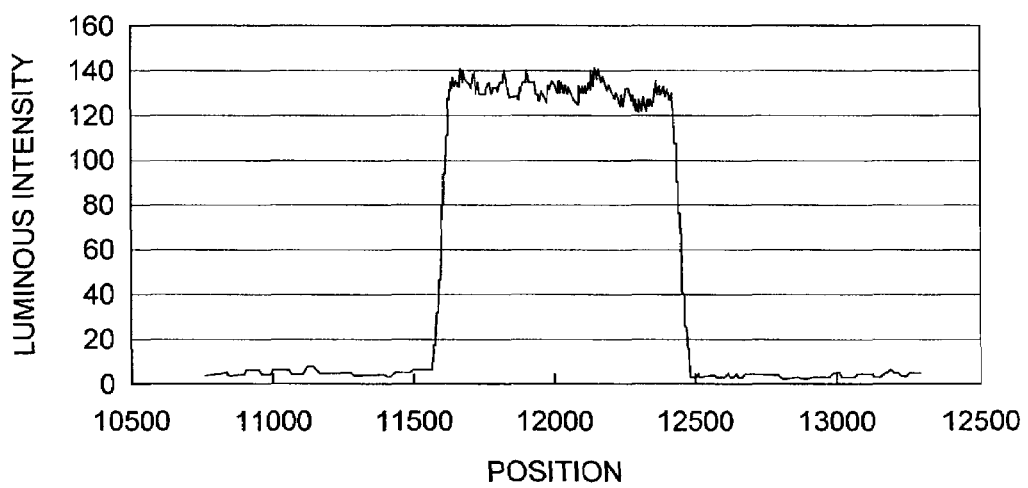

FIG. 16(*a*) and FIG. 16(*b*) show graphs of intensity transients of light beams emitted from all over channels included in optical unit 23 embodied in the present invention. Intensity transient in case of not conducting the light-intensity compensation processing is indicated in FIG. 16(*a*), while another intensity transient in case of conducting the light-intensity compensation processing is indicated in FIG. 16(*b*), and the horizontal axis indicates positions in a sub-scanning direction. In other words, each of the graphs shown in FIG. 16(*a*) and FIG. 16(*b*) indicates a luminous intensity of the light beam when optical unit 23 is positioned in a range of position 11600–12400.

In FIG. 16(*a*), the peak value located at position A is lower than that located at anyone of other positions. This indicates a fact that the peak of the beam profile irradiated from the channel located at position A is lower than that irradiated from each of the other channels. Such the variations of the beam profiles cause the image-unevenness when forming the image on photosensitive material 5. Further, on the graph shown in FIG. 16(*a*), there are some peaks, which exceed the luminous intensity of 140, despite that the desired luminous intensity of the light beams is in a range of 130–140. Accordingly, sometimes, such the exceeded luminous intensity would result in quality deterioration of the image formed on photosensitive material 5.

On the other hand, the graph shown in FIG. 16(*b*) indicates a result of applying the light-intensity compensation processing to all of the LEDs included in light-source holding blocks 41, 42, 43. Thanks to the light-intensity compensation processing, since there are no extraordinarily protruded peaks of luminous intensity on the graph shown in FIG. 16(*b*), the peak intensities of the beam profiles irradiated from all over the channels are substantially uniform. Further, since the intensities of the light beam emitted from all over the channels are in a range of 130–140, being an optimum intensity range for exposing photosensitive material 5, it becomes possible to form a good quality image on photosensitive material 5.

As mentioned above, by applying the light-intensity compensation processing to the light beams, irradiated from light-source holding blocks 41, 42, 43, based on the compensating data of CH light-intensity compensation table 802, it is possible to compensate for each intensity of the light beams irradiated from a plurality of channels at an optimum value. Accordingly, it also becomes possible to reduce the image-unevenness when forming the image on photosensitive material 5.

Further, since no compensation lens, etc. are employed for adjusting the intensity of the light beams, it becomes possible to reduce the number of manufacturing processes and the manufacturing cost, and to easily compensate for the beam profiles of the light source.

Incidentally, the scope of the present invention is not limited to the contents of the abovementioned embodiment. The disclosed embodiment can be varied by a skilled person without departing from the spirit and scope of the invention. For instance, it is also applicable that the light-intensity compensation processing is only applied to the specific LEDs, which irradiate the light beams, for exposing the color(s) of Cyan and/or Magenta except Yellow, onto photosensitive material 5.

Concretely speaking, since the image-unevenness of color Yellow is almost imperceptible for the human eyesight, the light-intensity compensation processing can be applied to the specific LEDs only when irradiating the light beams for exposing the color(s) of Cyan and/or Magenta onto photosensitive material 5, without conducting the light-intensity compensation processing in respect to the light beams for exposing the color Yellow. By employing the above method, it becomes possible to rapidly and simply conduct the light-intensity compensation processing.

Figure 7:
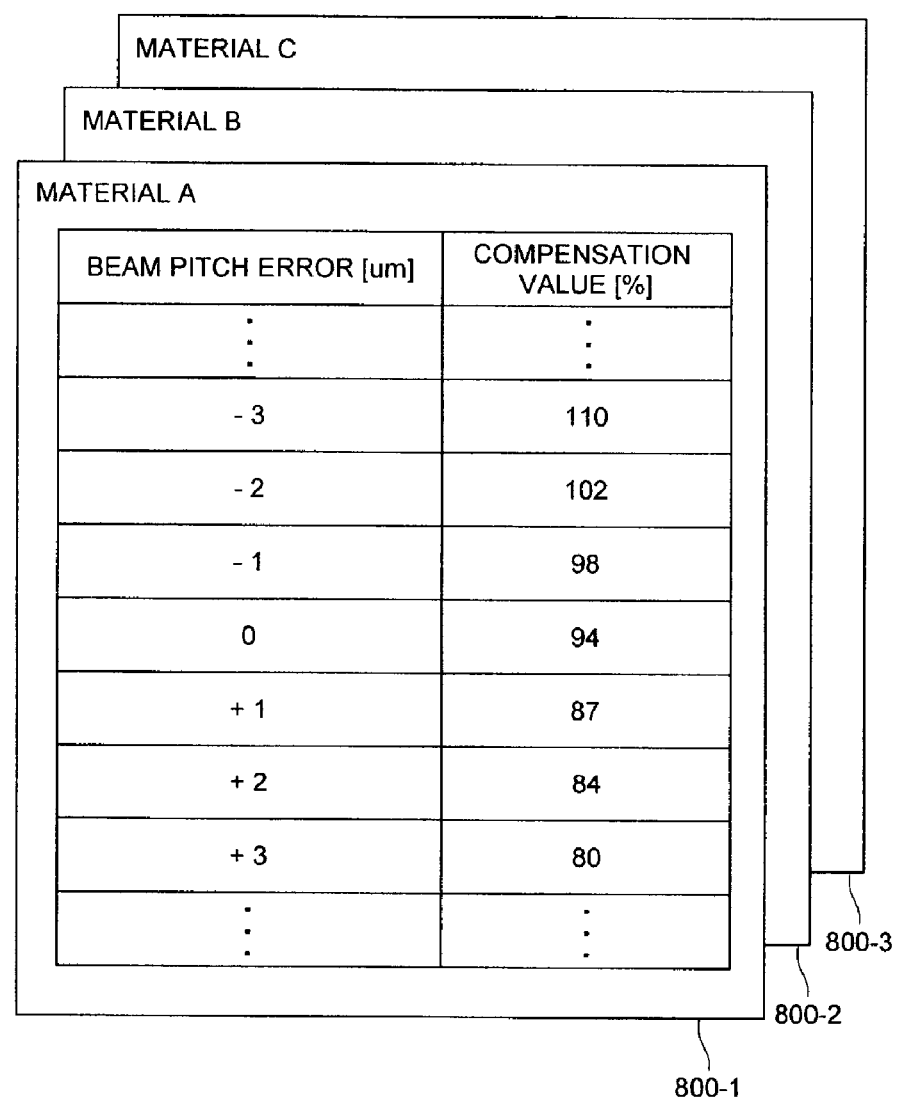

On the other hand, FIG. 7 shows a data structure of MA light-intensity compensation table 800. In MA light-intensity compensation table 800 serving as a data table, the compensation values of the intensities of the light beams emitted from the both-end channels are established, on the basis of beam pitch errors caused by the manufacturing variations of light-source holding blocks 41, 42, 43, etc. MA light-intensity compensation table 800 is further established in regard to every material characteristic of photosensitive material 5. For instance, MA light-intensity compensation tables 800-1, 800-2, 800-3 are established in regard to materials A, B, C, respectively.

For instance, in case that the beam pitch error of light-source holding block 41 is +3 μm when forming the image on photosensitive material 5 of material A, the individual material light-intensity compensation values for the light beams irradiated from the both channels are set at 80%, deriving from MA light-intensity compensation table 800-1. In this case, since the beam pitch is widened by +3 μm compared to the normal beam pitch, the peripheral portion of "n"-th recording area overlaps with those of "n−1"-th and "n+1"-th recording areas on photosensitive material 5. For this reason, the color density of the portion where the exposing operations are duplicated becomes dense, resulting in the density-unevenness of the image. Accordingly, when the beam pitch is wider than the normal value, intensities of the light beams emitted from the both end channels are reduced.

On the other hand, still in FIG. 7, in case that the beam pitch error of image-forming apparatus 100 is −3 μm when forming the image on photosensitive material 5 of material A, the individual material light-intensity compensation values for the light beams irradiated from the both channels are set at 110%, deriving from MA light-intensity compensation table 800-1. In this case, since the beam pitch is shortened by −3 μm compared to the normal beam pitch, non-exposed portions or extraordinarily weak-exposed portions, located between "n"-th recording area and "n−1"-th and "n+1"-th recording areas, are generated in a main-scanning direction. For this reason, the color density of the weak-exposed portions becomes pale, resulting in the density-unevenness of the image. Accordingly, when the beam pitch is shorter than the normal value, intensities of the light beams emitted from the both end channels are increased.

The data of MA light-intensity compensation table 800, obtained by measuring the characteristics of the light beams emitted from optical unit 23 during the assembling process of image-forming apparatus 100 in the factory, are stored in advance in ROM 602 for every kind of photosensitive material 5 to be employed for image-forming apparatus 100.

FIG. 8 shows a data structure of TA light-intensity compensation table 801. The compensation values, for the intensities of the light beams necessary for obtaining the desired density in the image formed on photosensitive material 5 (hereinafter, referred to as the target light intensity), are established in TA light-intensity compensation table 801 serving as a data table. Further, sometimes, the visualized pattern of the image-unevenness varies depending on the difference between the material characteristics in photosensitive material 5. To cope with such the problem, corresponding to the desired density, the intensities of the light beams are compensated on the basis of the data stored in TA light-intensity compensation table 801, which is established on the basis of the measured values obtained by measuring the material characteristics of photosensitive material 5, and which is stored in ROM 602 in advance during the assembling process of image-forming apparatus 100 in the factory.

FIG. 9 shows a data structure of CH light-intensity compensation table 802. The compensation values, for the target light intensity of the light beam emitted from each of channels, are stored in CH light-intensity compensation table 802. The data, established in CH light-intensity compensation table 802, are created during the executing process of light-intensity compensation program 803. The method for establishing such the data will be detailed later.

Figure 10:
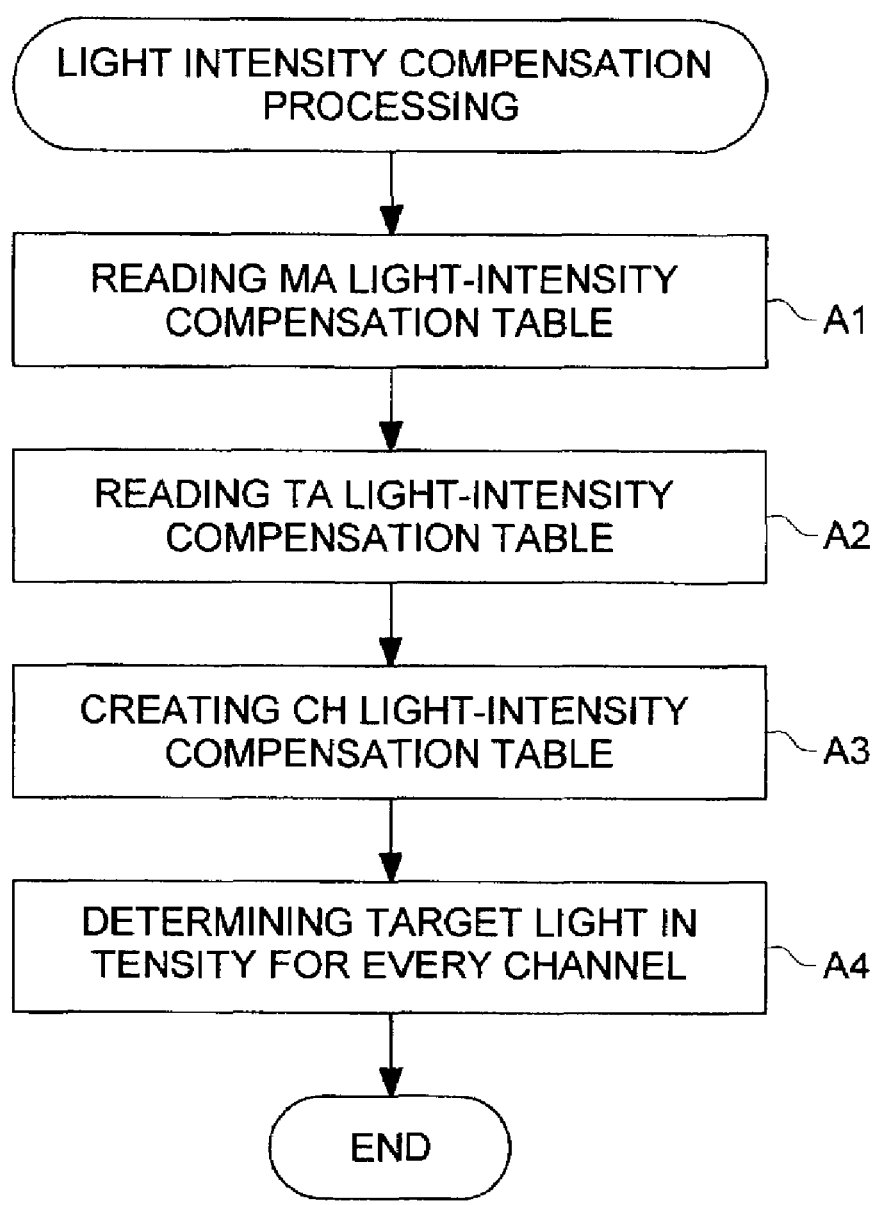
FIG. 10 shows a flowchart of the light-intensity compensation processing.

FIG. 10 shows a flowchart of the light-intensity compensation processing. In step A1, in accordance with a kind of material employed for photosensitive material 5, CPU 600 retrieves one of MA light-intensity compensation tables 800-1, 800-2 and 800-3 from ROM 602 and stores the retrieved one in RAM 601. When, for instance, the operator loads photosensitive material 5 into paper loading section 1, the operator inputs material-kind data for distinguishing the kind of material employed for photosensitive material 5 by means of touch panel 62. Alternatively, it is also possible for the operator to input them at the time of executing light-intensity compensation program 803. The inputted material-kind data are stored in RAM 601, so that CPU 600 can retrieve one of MA light-intensity compensation tables 800 by reading the material-kind data from RAM 601 in step A1.

For instance, when material A is employed as photosensitive material 5, CPU 600 retrieves MA light-intensity compensation table 800-1 from ROM 602. Then, when the beam-pitch error is +3 μm, CPU 600 sets the material light-intensity compensation value at 80%, and stores the value in RAM 601.

In step A2, CPU 600 retrieves TA light-intensity compensation table 801 from ROM 602, and stores it in RAM 601. While, LUT 609 inputs the digital image data from data buffer 608 and converts them into the R, G, B image data to determine the target light-intensity. Then, CPU 600 establishes the target light-intensity compensation value by inputting the target light-intensity.

For instance, when LUT 609 determines the target light-intensity at 110%, CPU 600 sets the target light-intensity compensation value at 95%, deriving from TA light-intensity compensation table 801, and store it in RAM 601.

In step A3, CPU 600 establishes the data of CH light-intensity compensation table 802 in accordance with the material light-intensity compensation value and the target light-intensity compensation value respectively found in step A1 and step A2. At first, since the target light-intensity compensation value is 95%, CPU 600 sets the target light-intensity for allover channels at 95%. Further, since the material light-intensity compensation value is 80%, CPU 600 sets the target light-intensity for both end channels, namely channel 1 and channel 2, at 95%×80%=76%.

In step 4, CPU 600 applies compensation processing to the digital image data inputted from LUT 609, on the basis of the compensation value stored in CH light-intensity compensation table 802, and then, outputs the compensated image data to LUT 609. Then, the light-intensity compensation processing is finalized.

As mentioned in the above, MA light-intensity compensation table 800 is established on the basis of material characteristics of photosensitive material 5 and the manufacturing variations of light-source holding blocks 41, 42, 43, while, CH light-intensity compensation table 802 is created by executing light-intensity compensation program 803. Further, the light-intensity of the light beams, emitted from the both end channels, is adjusted by conducting the light-intensity compensation processing for the light beam of each channel on the basis of the data included in the above tables. Accordingly, it becomes possible to reduce the image-unevenness in the image formed on photosensitive material 5.

Further, when the densities of the images formed on the photosensitive materials differ each other due to the variation of the material characteristics of photosensitive material 5 and the visualized pattern of the image-unevenness varies corresponding to the differences between the densities of the images, the light-intensities of the light beams are compensated on the basis of the data stored in TA light-intensity compensation table 801 so as to obtain a desired density in the exposing operation. Accordingly, it becomes possible to reduce the image-unevenness in the image formed on photosensitive material 5.

Incidentally, in the foregoing explanations, the data of MA light-intensity compensation table 800 are defined as the default data, which is determined in advance at the factory. It is also applicable, however, that the operator can arbitrarily change the contents of the above-mentioned data by inputting new data from touch panel 62. Further, by mounting a communicating section capable of performing bilateral data communication with an external apparatus in image-forming apparatus 100, it becomes possible to transmits a new MA light-intensity compensation table to the communicating section of image-forming apparatus 100 from the external apparatus through a network, etc., though this configuration is not shown in the drawings. Then, CPU 600 changes MA light-intensity compensation table 800 stored in ROM 602 to new MA light-intensity compensation table received from the external apparatus. Accordingly, even if photosensitive material 5, which is not registered in MA light-intensity compensation table 800, is employed, it becomes possible to conduct the light-intensity compensation processing by inputting new compensation values based on its material characteristics from an external environment.

Further, for instance, it is also applicable that the light-intensity compensation processing is only applied to the LEDs, which expose colors of cyan and/or magenta excluding yellow and irradiate the light beams from the both end channels.

This is because; the image-unevenness of yellow on photosensitive material 5 is almost imperceptible with the human eyesight. In addition, this can be achieved by applying the light-intensity compensation processing to the LEDs concerned, only when irradiating the light beams for exposing colors of cyan and/or magenta onto photosensitive material 5 from the both end channels, without conducting the light-intensity compensation processing in respect to the light beam for exposing a color of yellow onto photosensitive material 5. Accordingly, it becomes possible to speedy and simply conduct the light-intensity compensation processing.

Next, referring to the drawings, the second embodiment of the present invention will be detailed in the following.

Initially, the mechanical configuration of the image-forming apparatus, serving as the second embodiment of the present invention, will be detailed in the following.

Incidentally, the second embodiment is an image-forming apparatus, which produces a color proof utilized for checking image data serving as base data for the printing plate by exposing a color photosensitive material with a plurality of light beams having different wavelengths relative to each other based on dot-image data processed by RIP (Raster Image Processor) and sent from a host apparatus.

Figure 17:
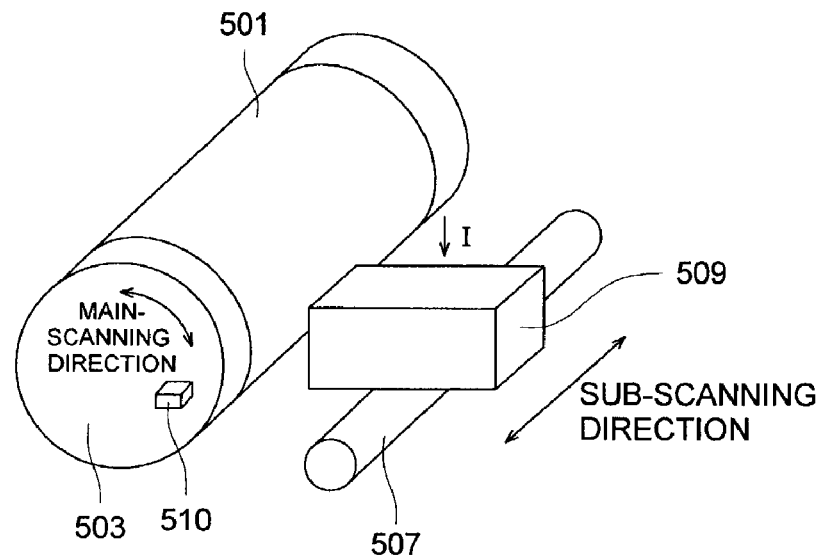
FIG. 17 shows an overall configuration of an apparatus embodied in the present invention.

In FIG. 17 indicating a overall configuration, drum 503, on which photosensitive material 501 is wrapped, is driven by a driving source (not shown in the drawings) so as to rotate it in a main-scanning direction. Guide 507 is arranged in the bus-line direction (the sub-scanning direction) of the drum 503 and exposing unit 509 driven by a driving source (not shown in the drawings) moves along guide 507.

Further, beam monitor 510 for detecting the light beam emitted from exposing unit 509 is disposed at a side space of drum 503.

Figure 18:
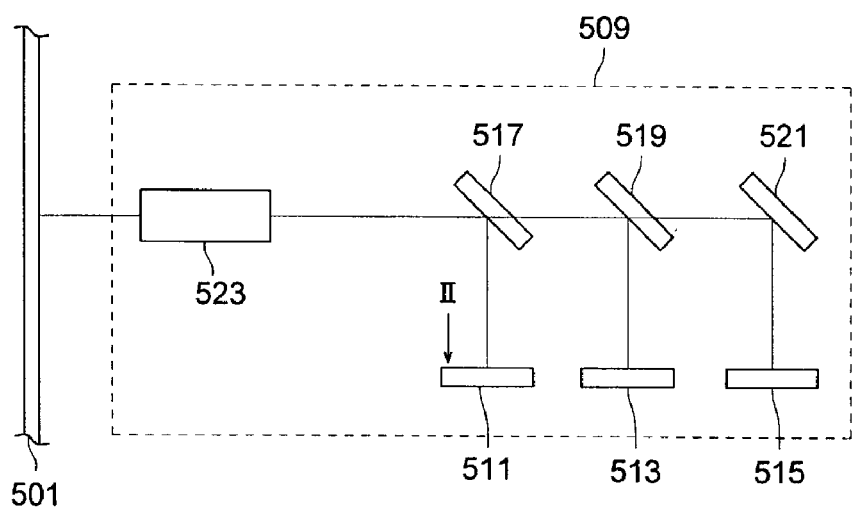
FIG. 18 shows an internal configuration of an exposing unit, viewing from the direction indicated by arrow I in FIG. 17.

FIG. 18 shows an internal configuration of exposing unit 509, viewing from the direction indicated by arrow I in FIG. 17. In exposing unit 509 shown in FIG. 18, light source units 511, 513, 515, each of which emits a plurality of light beams, are arranged. In the second embodiment, light source units 511, 513, 515 correspond to R (Red color), G (Green color) and B (Blue color), respectively.

The light beams, emitted from light source units 511, 513, are reflected by dichroic mirrors 517, 519, which transmit a part of the light and reflect another part of the light, while the light beam, emitted from light source unit 515, is reflected by reflection mirror 521, and then, these three light beams are converged onto photosensitive material 501 through converging-lens optical system 523.

Figure 19:
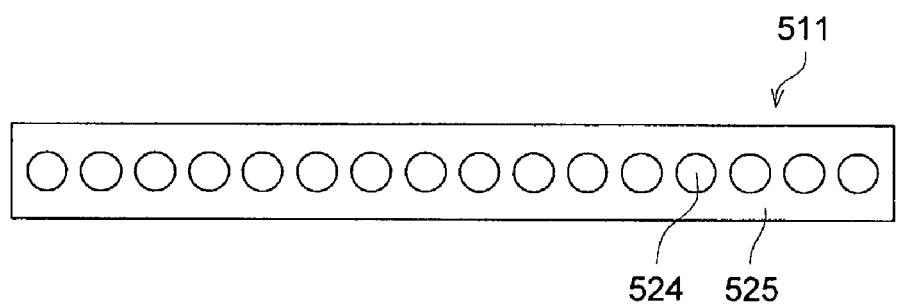
FIG. 19 shows a view of a light source unit, viewing from the direction indicated by arrow II in FIG. 18.

As shown in FIG. 19, which shows a view of light source unit 511 viewing from the direction indicated by arrow II in FIG. 18, a plurality of LEDs 524 arranged in a line and holder 525 for holding LEDs 524 constitute light source unit 511.

Incidentally, since each configuration of other light source units 513, 515 is the same as that of light source unit 511, the explanations for them will be omitted.

Figure 20:
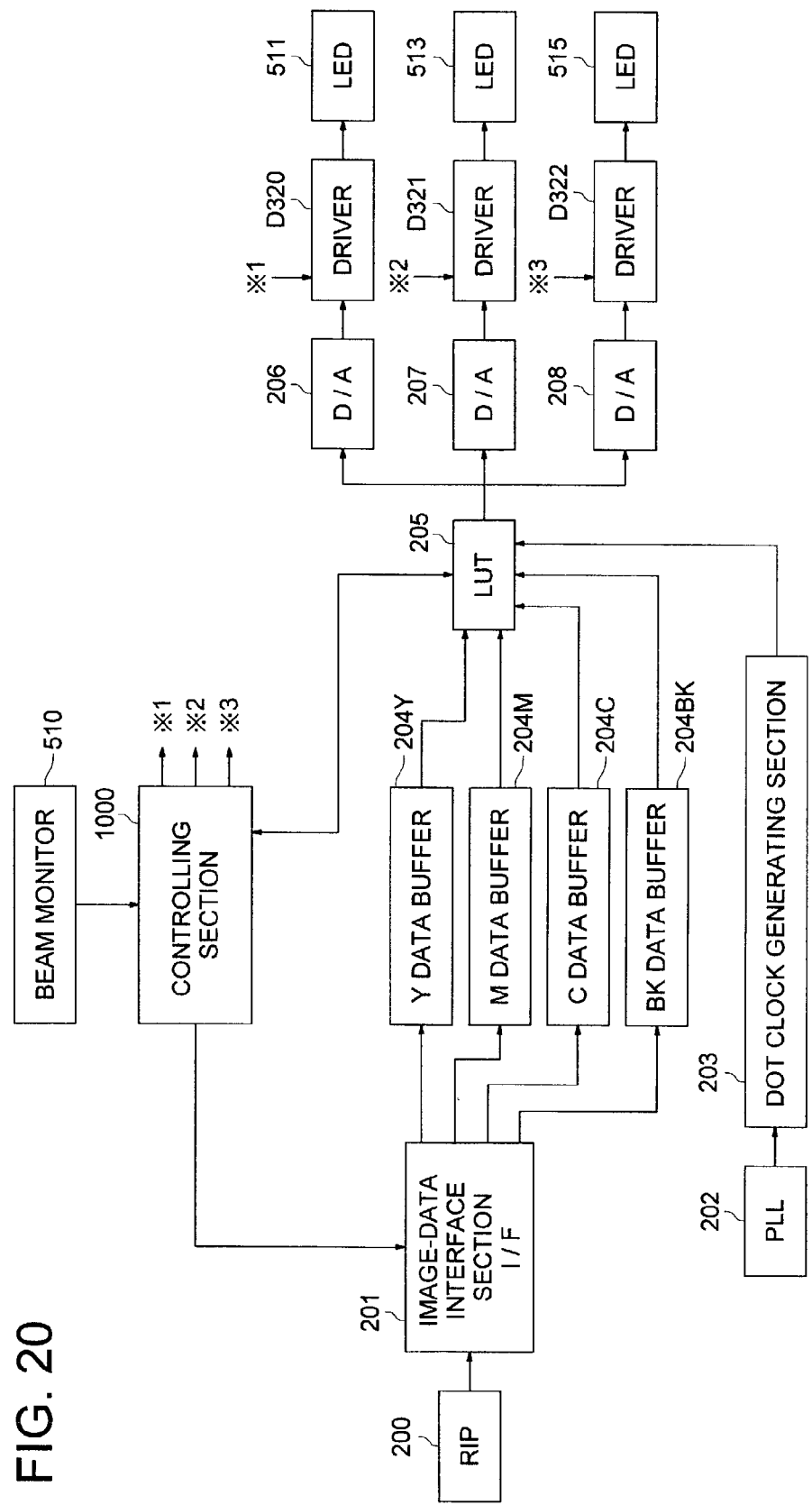
FIG. 20 shows an electronic configuration of an apparatus embodied in the present invention.

Next, referring to FIG. 20, the electronic configuration of the abovementioned apparatus will be detailed in the following.

The digital image data are transmitted to data buffer 204 from RIP 200 externally coupled to the apparatus through image-data interface section 201.

On the other hand, synchronizing with the outputted signals of PLL 202 based on photosensitive material feeding information outputted by the rotary encoder mounted on drum 503, the digital image data are fed from data buffer 204 to driving sections D320, D321, D322, through LUT 205 (Look Up Table) and D/A converters 206-208, by the clocking actions of dot clock pulses generated by dot-clock generating section 203, so that driving sections D320, D321, D322 drive light source units 511, 513, 515, respectively.

In LUT 205 of the second embodiment, the target light-intensity compensation table, in which relations between densities and beam intensities are recorded, and the channel light-intensity compensation table, for forming an invisible unevenness with plural bars in the scanning lines, are stored.

Numeral 1000 indicates a controlling section for controlling image-data interface section 201 and LUT 205.

Incidentally, the dot image data for each color (C, M, Y, K) generated by RIP 200 are transferred to image-data interface section 201, in which the RIP format of the dot image data is converted to the other data-format utilized for exposing operation, and then, the converted dot image data are stored in data buffer 204. When the image data for forming an image of one sheet are accumulated in data buffer 204, all color images are simultaneously exposed.

Next, referring to the flowchart shown in FIG. 21, operations for determining the data for driving the light source, embodied in the present invention, will be detailed in the following.

In step 1, controlling section 1000 determines a target light intensity based on the data of the exposing format converted in image-data interface section 201.

In step 2, the target light intensity is compensated for based on the target light-intensity compensation table stored in LUT 205.

In step 3, the data, for forming the invisible unevenness with plural bars in the scanning lines, are read from the channel light-intensity compensation table stored in LUT 205.

In step 4, the channel light-intensity is determined.

When the apparatus generates an overlapped area between a main-scanning line and a next main-scanning line, the channel light-intensity compensation data is established, so as to form the invisible unevenness with plural bars, having a density-difference substantially equivalent to that between the target density and the density of the overlapped area, in the main-scanning lines.

Further, when the apparatus generates a gap between a main-scanning line and a next main-scanning line, the channel light-intensity compensation data is established, so as to intensify the intensity of the light beam irradiated onto a portion adjacent to the gap of the next main-scanning line, and so as to form the invisible unevenness with plural bars, having a density-difference substantially equivalent to that between the target density and the density of the portion, in the main-scanning lines.

Further, when the apparatus generates a gap or a duplication between a main-scanning line and a next main-scanning line, the channel light-intensity compensation data is established, so as to intensify the intensity of the light beam irradiated onto a portion adjacent to the gap of the next main-scanning line, and so as to form the invisible unevenness with plural bars, having a density-difference substantially equivalent to that between the target density and the density of the portion, in the main-scanning lines.

Figure 22:
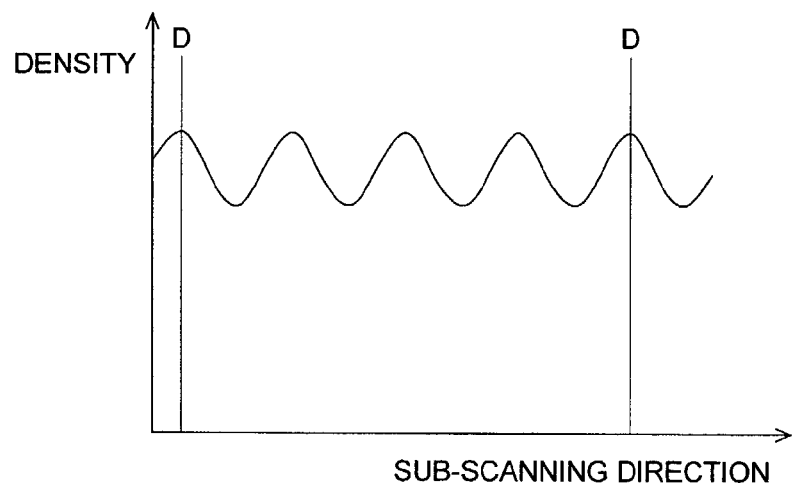
FIG. 22 shows a graph for explaining the operation of step 4 shown in FIG. 21.

Concretely speaking, for instance, as shown in FIG. 22, the density-differences are intentionally formed between image-unevenness (the portions indicated by fine solid lines D) caused by the duplication of the main-scanning lines, so as to make the image-unevenness unnoticeable.

Figure 21:
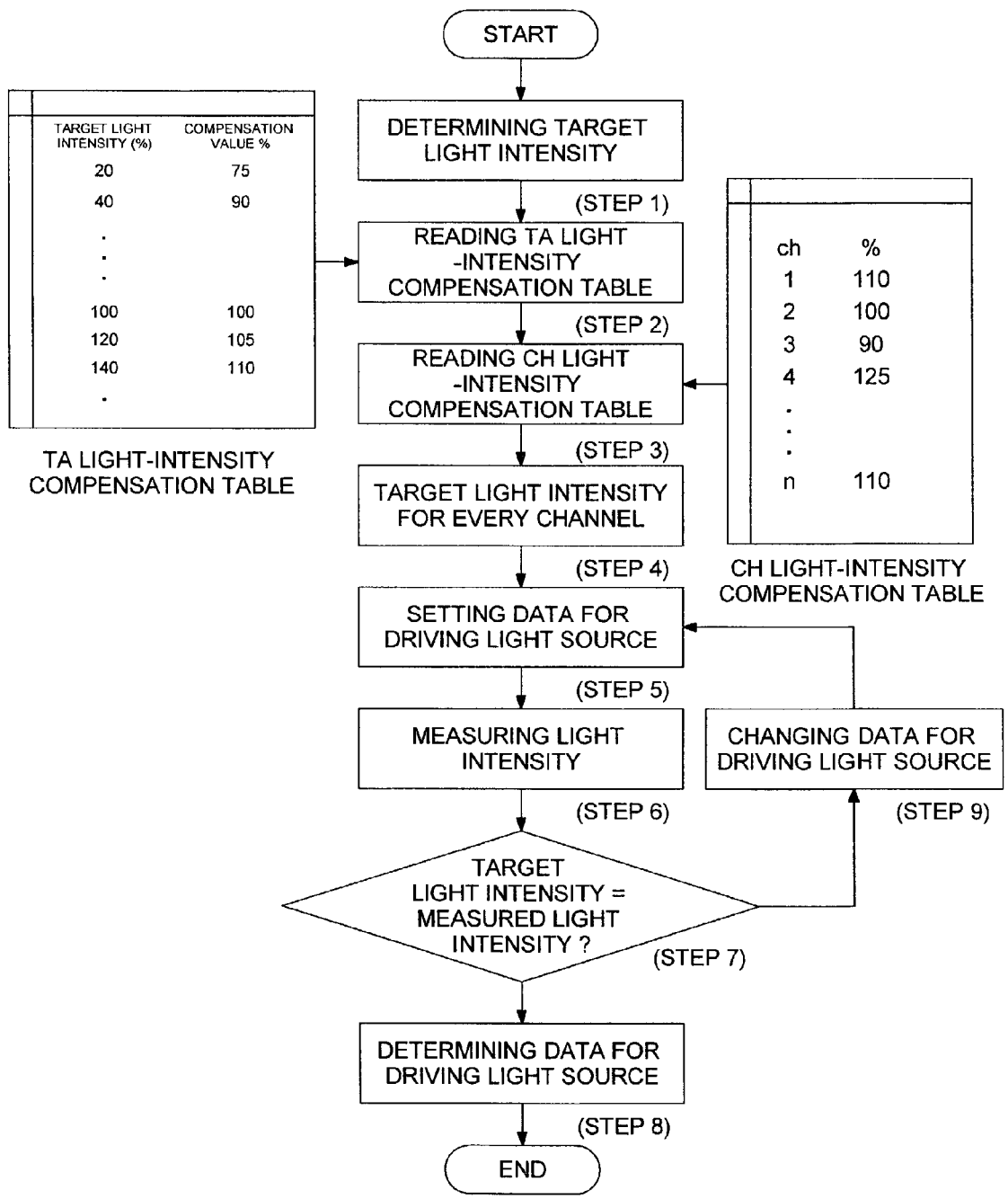
FIG. 21 shows a flowchart of operations for determining data for driving a light source embodied in the present invention.

Now, returning to the flowchart shown in FIG. 21, in step 5, the data for driving the light source are set.

In step 6, the light intensity is measured by means of beam monitor 510.

In step 7, controlling section 1000 determines whether or not the measured light intensity is equal to the target light intensity.

In step 8, when controlling section 1000 determines that the measured light intensity is equal to the target light intensity in step 7, the data for driving the light source is determined as it is.

In step 9, when not in step 7, controlling section 1000 changes the data for driving the light source and returns to step 5 with the changed data.

Incidentally, in the second embodiment of the present invention, the density, obtained by changing the intensity of the light beam, is in a range of 70%–130%, when the target density is set at 100%.

Figure 23:
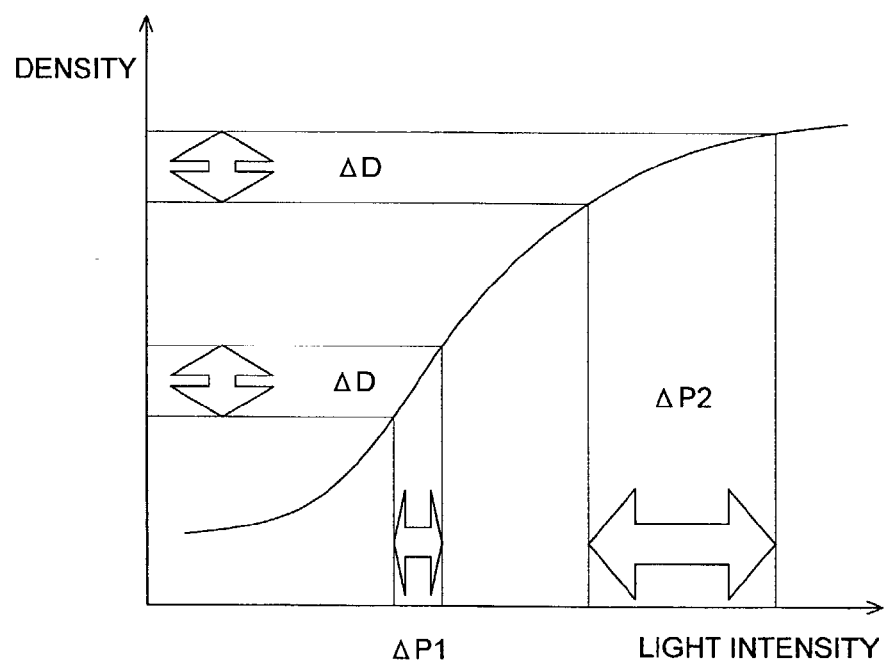
FIG. 23 shows a graph indicating a relationship between a photosensitive material of general use and an exposing amount.
Figure 24:
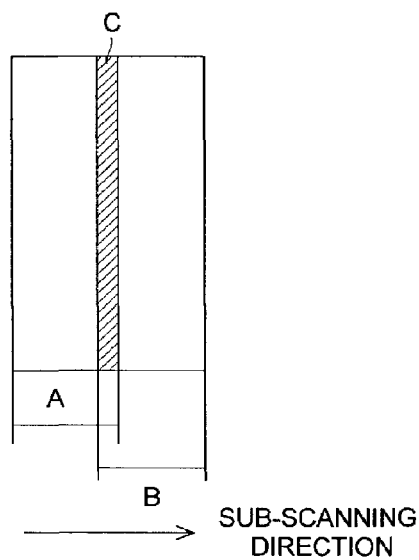
FIG. 24($a$) and FIG. 24($b$) show schematic diagrams for explaining an occurrence of the image-unevenness.
Figure 24:
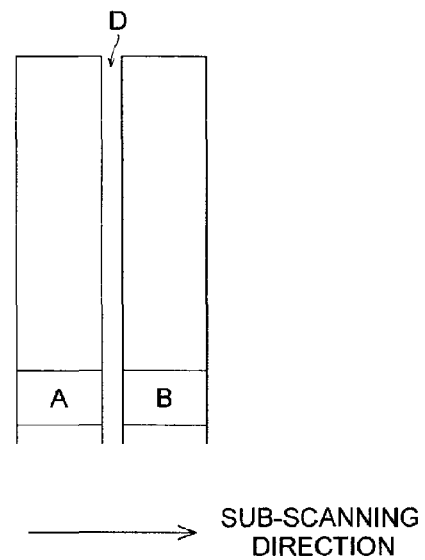
Figure 24:
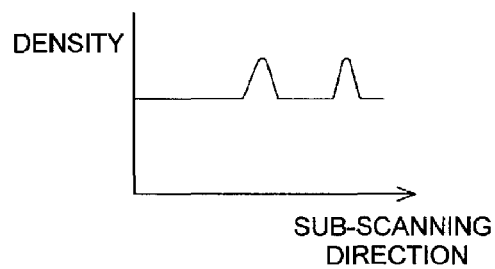
Figure 24:
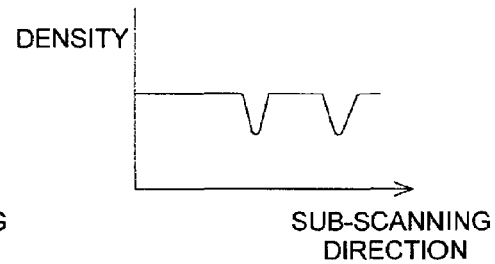
Figure 25:
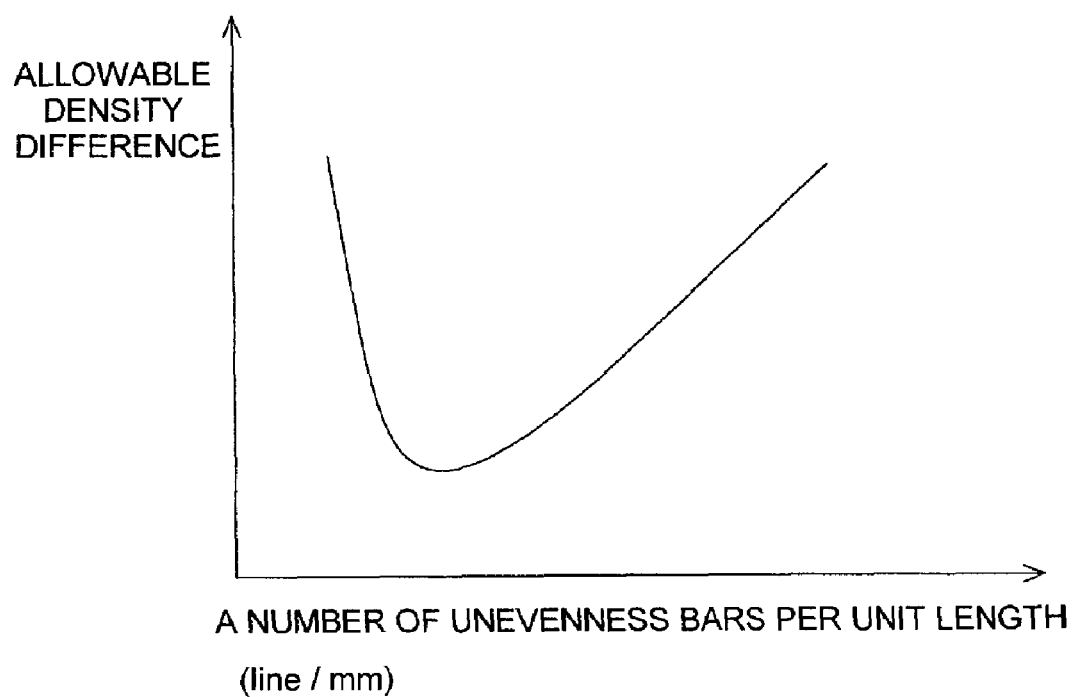
FIG. 25 shows a graph of a number of unevenness bars per unit area, indicating an area at which the image-unevenness becomes unnoticeable.

FIG. 23 shows a relationship between a photosensitive material of general use and an exposing amount. Assuming that a sense of incongruity for the image becomes perceptible at the density-difference $\Delta D$=around±0.2D though a sense of incongruity considerably varies depending on characteristics of the photosensitive material and the color concerned, a required adjusting value of the light intensity varies depending on the desired density, and typically, the light intensity adjusting range is $\Delta P$=around±11% ($\Delta P1$)–±30% ($\Delta P2$).

According to the abovementioned configuration, the following effects can be obtained.

(1) When the apparatus generates an overlapped area between a main-scanning line and a next main-scanning line, it becomes possible to make the image-unevenness unnoticeable by forming the invisible unevenness with plural bars, having a density-difference substantially equivalent to that between the target density and the density of the overlapped area, in the main-scanning lines.

On the other hand, when the apparatus generates a gap between a main-scanning line and a next main-scanning line, it becomes possible to make the image-unevenness unnoticeable by intensifying the intensity of the light beam irradiated onto a portion adjacent to the gap of the next main-scanning line, and by forming the invisible unevenness with plural bars, having a density-difference substantially equivalent to that between the target density and the density of the portion, in the main-scanning lines.

Further, the abovementioned effects can be attained only by controlling the light source, which emits the light beam, resulting in a cost reduction of the apparatus.

(2) It becomes possible to obtain an accurate density by providing a table for compensating for the target light intensity corresponding to the target density in LUT 205 and by changing the light intensity of the light beam in response to the target density.

(3) Since the density, obtained by changing the intensity of the light beam, is in a range of 70%–130%, when the target density is set at 100%, it is difficult to notice the density difference, even if the obtained image is enlarged.

Incidentally, the scope of the present invention is not limited to the abovementioned embodiment.

For instance, although the operation for determining the data for driving the light source as shown in FIG. 21 is performed in regard to each of the colors R, G, B in the second embodiment, it is also applicable that the abovementioned operation is performed only for the light component having a wavelength at which the image-unevenness is specifically noticeable.

Further, owing to manufacturing errors of the LEDs, the wavelengths of the light beams emitted from the LEDs vary from one to another, and the densities in the recorded image also vary corresponding to the differences between the wavelengths. Accordingly, it is also applicable that the light intensity of each LED is compensated for by providing a light intensity compensation table corresponding to the differences between the wavelengths of the LEDs in LUT 205.

As described in the foregoing descriptions, according to the present invention, the following effects can be attained.

(1) By compensating for the light-intensity of each of the light source to obtain the desired light-intensity, based on the light-intensity compensating data, it is possible to control the light-intensity of each of a plurality of light sources. Accordingly, since it becomes possible to make the peak values of the beam profiles, formed by overlapping the light beams emitted from the light sources, uniform, it is possible to reduce the image-unevenness when forming the image on the photosensitive material by exposing the light beams emitted from the light sources.

Further, it becomes possible to reduce the number of manufacturing processes and the manufacturing cost and easy to compensate for the image-unevenness, compared to the adjusting method of beam profiles of the light sources by means of the compensating lens.

(2) By compensating for the light-intensity of each of the light source to obtain the desired light-intensity, based on the light-intensity compensating data of a plurality of light-emitting elements having different colors and included in each of the light sources, it is possible to control the light-intensity of each of a plurality of light sources. Accordingly, since it becomes possible to make the peak values of the beam profiles, formed by overlapping the light beams emitted from the light sources, uniform, it is possible to reduce the image-unevenness when forming the color image on the photosensitive material by exposing the light beams emitted from the light sources.

(3) When the image-forming apparatus forms the image onto the recording material by conducting the exposing operation, since the image-unevenness of color Yellow is almost imperceptible for the human eyesight, the light-intensity compensation processing is applied only to the light-emitting elements, which irradiates the light beams for exposing the color(s) of Cyan and/or Magenta onto the recording material. By employing the above method, it becomes possible to rapidly and simply conduct the light-intensity compensation processing.

(4) Among the plurality of light sources included in the light source means, the light amounts of light sources located at the one end and the other end can be adjusted by compensating for the light amounts for light sources located at the one end and the other end, based on the light-amount compensation data stored in the memory means. Accordingly, when forming the image onto the photosensitive recording medium by exposing it with the light source means, it becomes possible to adjust the exposing amount emitted by the light sources located at the one end and the other end. As a result, it becomes possible to reduce the image-unevenness caused by decreases, etc. of the exposing amount emitted by the light sources located at the one end and the other end.

(5) The value of the light-amount compensation data can be changed by employing the data-value variable means for varying a value of the light-amount compensation data. Accordingly, it becomes possible to arbitrarily set adjusting amounts of the light sources located at the one end and the other end of the light source means.

(6) The exposing amount emitted by the light sources located at the one end and the other end of the light source means can be controlled according as the characteristics of the photosensitive recording medium by storing the light-amount compensation data for every characteristics of the photosensitive recording medium in the memory means and by adjusting the light amount of the light sources located at the one end and the other end, based on the light-amount compensation data corresponding to the characteristics of the photosensitive recording medium employed. As a result, it becomes possible to reduce the image-unevenness caused by decreases, etc. of the exposing amount emitted by the light sources located at the one end and the other end.

(7) The exposing amount emitted by the light sources located at the one end and the other end of the light source means onto the recording medium can be adjusted in response to the difference between the arranging conditions of the light sources, by storing the light-amount compensation data in the memory means, for every arranging condition of the light sources included in the light source means, and by adjusting the light amount of the light sources located at the one end and the other end, based on the light-amount compensation data corresponding to the arranging condition of the light sources employed. As a result, it becomes possible to reduce the image-unevenness caused by decreases, etc. of the exposing amount emitted by the light sources located at the one end and the other end.

(8) The light amounts at the one end and the other end can be adjusted by compensating for each of the light-emitting elements to the desired light amount, based on the light-amount compensation data for the plurality of the light-emitting elements having colors different relative to each other, which constitute the light sources located at the one end and the other end of the light source means. As a result, it becomes possible to reduce the image-unevenness caused by decreases, etc. of the exposing amount emitted by the light sources located at the one end and the other end.

(9) Even if the density of the image formed on the recording medium varies depending on the differences between material characteristics or requests of the operator, it becomes possible to adjust light amount at the one end and the other end corresponding to the desired density. As a result, it becomes possible to reduce the image-unevenness of the image formed on the recording medium.

(10) Since it is rather difficult for the human eyesight to notice the image-unevenness of color yellow in the full color image formed on the recording medium by exposing operation of the image-forming apparatus, the light amounts only for the light-emitting elements included in the light sources located at the one end and the other end, which irradiate light beams for exposing colors of cyan and magenta, are compensated for. As a result, it becomes possible to complete the light-amount compensation operation more speedy, compared to the case in which all of the light-emitting elements, included in the light sources located at the one end and the other end, are compensated for.

(11) When the overlapped area is generated on the main-scanning line and the next main-scanning line, it becomes possible to make the image-unevenness unnoticeable by forming the invisible unevenness with plural bars, having a density-difference substantially equivalent to that between the target density and the density of the overlapped area, in the main-scanning lines.

In addition, the abovementioned feature can be attained only by controlling the light sources, which emit the light beams, resulting in a cost-reduction of the image-forming apparatus.

(12) When the gap is generated between a main-scanning line and a next main-scanning line, it becomes possible to make the image-unevenness unnoticeable by intensifying the intensity of the light beam irradiated onto the portion adjacent to the gap of the next main-scanning line and by forming the invisible unevenness with plural bars, having a density-difference substantially equivalent to that between the target density and the density of the portion at which the intensity of the light beam is intensified, in the main-scanning lines.

In addition, the abovementioned feature can be attained only by controlling the light sources, which emit the light beams, resulting in a cost-reduction of the image-forming apparatus.

(13) When the gap or the space is generated between a main-scanning line and a next main-scanning line, it becomes possible to make the image-unevenness unnoticeable by intensifying the intensity of the light beam irradiated onto the portion adjacent to the gap of the next main-scanning line and by forming the invisible unevenness with plural bars, having a density-difference substantially equivalent to that between the target density and the density of the portion at which the intensity of the light beam is intensified, in the main-scanning lines.

In addition, the abovementioned feature can be attained only by controlling the light sources, which emit the light beams, resulting in a cost-reduction of the image-forming apparatus.

(14) When a color image is formed by employing a plurality of light beams having wavelengths being different relative to each other, it becomes possible to make the image-unevenness unnoticeable by employing the image-forming method, recited in anyone of items 29–31, to conduct the image-forming operation in respect to the specific light beam having the wavelength at which the image-unevenness is specifically noticeable.

In addition, the abovementioned feature can be attained only by controlling the light sources, which emit the light beams, resulting in a cost-reduction of the image-forming apparatus.

(15) It becomes possible to obtain an accurate density, by investigating the relationship between density and the intensity of light beam in advance, and by changing the intensity of the light beam corresponding to the target density.

(16) Owing to errors in the manufacturing process of the light sources emitting the light beams, the wavelengths of the light beams emitted by the light sources are varied, and the densities of the images are also different each other corresponding to the differences between the wavelengths.

By changing the respective light amount of light beams corresponding to a difference between wavelengths of the plurality of light beams, the target density can be obtained.

(17) Since the density, obtained by changing the light amount of the light beam, is in a range of 70%–130%, when the target density is set at 100%, the density difference is unnoticeable, even if the obtained image is enlarged.

Disclosed embodiment can be varied by a skilled person without departing from the spirit and scope of the invention.

What is claimed is:

1. An apparatus for forming an image onto a photosensitive recording medium, said apparatus comprising:
   a light source, including a plurality of light-emitting elements aligned within a predetermined width for emitting a corresponding plurality of light beams;
   an exposure-controlling section to individually control respective intensities of respective ones of the light beams emitted by said plurality of light-emitting elements; and
   a memory section to store light-intensity compensation data for each of said plurality of light-emitting elements that emit the plurality of controlled light beams;
   wherein said image is formed by simultaneously exposing said light beams onto said photosensitive recording medium;
   wherein said exposure-controlling section controls each of said plurality of light-emitting elements that emit the plurality of controlled light beams based on said light-intensity compensation data corresponding thereto, so that said intensities of said controlled light beams substantially coincide with preset corresponding target intensities;
   wherein said light beams emitted by said plurality of light-emitting elements comprise light beams having different wavelengths corresponding to colors of cyan, magenta and yellow, and each color of cyan, magenta and yellow is developed on said photosensitive recording medium to form a full color image on said photosensitive recording medium; and
   wherein said exposure-controlling section comprises a recognizer for recognizing light beams corresponding to colors of cyan and magenta, and said expoxure-controlling section only controls the intensities of light beams corresponding to said colors of cyan and magenta.

2. The apparatus of claim 1, further comprising:
   a main scanning-mechanism to move one of said photosensitive recording medium and said light source in S a main-scanning direction; and
   a sub-scanning mechanism to move one of said light source and said photosensitive recording medium in a sub-scanning direction.

3. The apparatus of claim 1, wherein said light-intensity compensation data corresponds to an overlapped-intensity distribution of said light beams.

4. An apparatus for forming an image onto a photosensitive recording medium, said apparatus comprising:
   a light source, including a plurality of light-emitting elements aligned within a predetermined width for emitting a corresponding plurality of light beams;
   an exposure-controlling section to individually control respective intensities of respective ones of the light beams emitted by said plurality of light-emitting elements;
   a main-scanning mechanism to move one of said photosensitive recording medium and said light source in a main-scanning direction;
   is a sub-scanning mechanism to move one of said light source and said photosensitive recording medium in a sub-scanning direction; and
   a memory section to store light-intensity compensation data for each of said plurality of light-emitting elements that emit the plurality of controlled light beams;
   wherein said image is formed by simultaneously exposing said light beams onto said photosensitive recording medium, and in order to compensate for possible unevenness in said image generated in said sub-scanning direction due to duplications of main-scanning lines, said light-intensity compensation data is provided to enable generation of a density-difference equivalent to a density-difference between said image-unevenness and a preset target density;
   wherein said exposure-controlling section controls each of said plurality of light-emitting elements that emit the plurality of controlled light beams based on said light-intensity compensation data corresponding thereto, so that said intensities of said controlled light beams substantially coincide with preset corresponding target intensities;
   wherein said light beams emitted by said plurality of light-emitting elements comprise light beams having different wavelengths corresponding to colors of cyan, magenta and yellow, and each color of cyan, magenta and yellow is developed on said photosensitive recording medium to form a full color image on said photosensitive recording medium; and
   wherein said exposure-controlling section comprises a recognizer for recognizing light beams corresponding to colors of cyan and magenta, and said exposure-controlling section only controls the intensities of light beams corresponding to said colors of cyan and magenta.

5. The apparatus of claim 4, wherein:
   a number of said plurality of light-emitting elements is defined as "N",
   a number of positions within one main-scanning line at which said density-difference is generated is defined as "n", and
   the following equation is established within said predetermined width:

$1 \leq n < N/2$.

6. The apparatus of claim 4, wherein the respective intensities of said controlled light beams are changed in response to wavelength-differences between said light beams emitted by said plurality of light-emitting elements.

7. The apparatus of claim 6, wherein, when each of said target intensities is set at 100%, the respective intensities of said controlled light beams are changeable within a range of 70%–130% in response to said wavelength-differences.

8. An apparatus for forming an image onto a photosensitive recording medium, said apparatus comprising:

a light source, including a plurality of light-emitting elements aligned within a predetermined width for emitting a corresponding plurality of light beams;

an exposure-controlling section to individually control respective intensities of respective ones of the light beams emitted by said plurality of light-emitting elements; and a memory section to store light-intensity compensation data for each of said plurality of light-emitting elements that emit the plurality of controlled light beams;

wherein said image is formed by simultaneously exposing said light beams onto said photosensitive recording medium; and wherein said light-intensity compensation data varies in accordance with changes of density-characteristics of developed color versus exposing light-intensity with respect to said photosensitive recording medium, and said exposure-controlling section controls each of said plurality of light-emitting elements that emit the plurality of controlled light beams based on said light-intensity compensation data corresponding thereto, so that said intensities of said controlled light beams substantially coincide with preset corresponding target intensities;

wherein said light beams emitted by said plurality of light-emitting elements comprise light beams having different wavelengths corresponding to colors of cyan, magenta and yellow, and each color of cyan, magenta and yellow is developed on said photosensitive recording medium to form a full color image on said photosensitive recording medium; and wherein said exposure-controlling section comprises a recognizer for recognizing light beams corresponding to colors of cyan and magenta, and said exposure-controlling section only controls the intensities of light beams corresponding to said colors of cyan and magenta.

9. The apparatus of claim 8, further comprising:

a main-scanning mechanism to move one of said photosensitive recording medium and said light source in a main-scanning direction; and a sub-scanning mechanism to move one of said light source and said photosensitive recording medium in a sub-scanning direction.

10. An apparatus for forming an image onto a photosensitive recording medium, said apparatus comprising:

a light source, including a plurality of light-emitting elements aligned within a predetermined width for emitting a corresponding plurality of light beams;

an exposure-controlling section to individually control a respective intensity of at least one controlled light beam of the light beams emitted by said plurality of light-emitting elements; and a memory section to store light-intensity compensation data for at least one of said light emitting elements that emits the at least one controlled light beam, said at least one of said light emitting elements comprising at least one of: one of said plurality of light-emitting elements located at one end of said predetermined width, and two of said plurality of light-emitting elements located at respective ends of said predetermined width;

wherein said image is formed by simultaneously exposing said light beams onto said photosensitive recording medium;

wherein said exposure-controlling section controls the at least one of said plurality of light-emitting elements that emits the at least one controlled light beam based on said light-intensity compensation data corresponding thereto, so that said respective intensity of said at least one controlled light beam substantially coincides with a preset corresponding target intensity;

wherein wavelengths of said light beams correspond to colors of cyan magenta and yellow, and each color of cyan, magenta and yellow is developed on said photosensitive recording medium to form a full color image on said photosensitive recording medium; and wherein said exposure-controlling section comprises a recognizer for recognizing a light beam corresponding to a color of one of cyan and magenta from said light beams located at respective ends of said predetermined width, and said exposure-controlling section only controls the intensity of a light beam corresponding to said color of one of cyan and magenta.

11. The apparatus of claim 10, further comprising:

a main-scanning mechanism to move one of said photosensitive recording medium and said light source in a main-scanning direction; and a sub-scanning mechanism to move one of said light source and said photosensitive recording medium in a sub-scanning direction.

12. The apparatus of claim 10, wherein said light-intensity compensation data corresponds to a manufacturing error of said predetermined width.

13. The apparatus of claim 10, wherein said light-intensity compensation data corresponding to image-developing characteristics of said photosensitive recording medium with respect to said predetermined width.

14. The apparatus of claim 10, wherein said light-intensity compensation data varies in accordance with changes of density-characteristics of developed color versus exposing light-intensity with respect to said photosensitive recording medium.

* * * * *